US012659087B2

(12) United States Patent
Wong et al.

(10) Patent No.:  US 12,659,087 B2
(45) Date of Patent:      Jun. 16, 2026

(54) TELECOMMUNICATIONS APPARATUS AND METHODS

(71) Applicant: Sony Group Corporation, Tokyo (JP)

(72) Inventors: Shin Horng Wong, Stuttgart (DE);
Martin Warwick Beale, Stuttgart (DE);
Kazuyuki Shimezawa, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 448 days.

(21) Appl. No.: 17/791,927

(22) PCT Filed: Jan. 18, 2021

(86) PCT No.: PCT/EP2021/050920
§ 371 (c)(1),
(2) Date: Jul. 11, 2022

(87) PCT Pub. No.: WO2021/160375
PCT Pub. Date: Aug. 19, 2021

(65) Prior Publication Data
US 2023/0050066 A1      Feb. 16, 2023

(30) Foreign Application Priority Data

Feb. 10, 2020    (EP) .................................... 20156393

(51) Int. Cl.
H04L 1/18          (2023.01)
H04L 1/1829      (2023.01)

(52) U.S. Cl.
CPC .................................. H04L 1/1861 (2013.01)

(58) Field of Classification Search
CPC .... H04L 1/1861; H04L 1/1854; H04L 1/1896
See application file for complete search history.

(56) References Cited

U.S. PATENT DOCUMENTS

| | | | | |
|---|---|---|---|---|
| 11,831,443 B2 * | 11/2023 | Babaei | ..................... | H04L 5/0091 |
| 12,089,216 B2 * | 9/2024 | Andersson | ............ | H04L 1/1861 |
| 2008/0310338 A1 | 12/2008 | Charpenter | | |
| 2011/0059767 A1 | 3/2011 | Parkvall | | |
| 2014/0064098 A1 | 3/2014 | Choi | | |
| 2016/0286558 A1 | 9/2016 | Chae | | |

(Continued)

FOREIGN PATENT DOCUMENTS

| | | | | |
|---|---|---|---|---|
| CA | 2931656 C | * | 7/2022 | ........... H04L 1/1861 |
| CN | 104769877 A | | 7/2015 | |

(Continued)

OTHER PUBLICATIONS

International Search Report and Written Opinion mailed on Mar. 19, 2021, received for PCT Application PCT/EP2021/050920, filed on Jan. 18, 2021, 9 pages including English Translation.

(Continued)

*Primary Examiner* — Jay P Patel
(74) *Attorney, Agent, or Firm* — XSENSUS LLP

(57)          ABSTRACT

A method of operating a terminal device in a wireless telecommunications system, the method comprising: attempting to decode a transmission of data to the terminal device; determining whether or not the data was successfully decoded; and transmitting acknowledgement signalling indicating whether or not the data was successfully decoded on radio resources that are determined by taking account of whether or not the data was successfully decoded.

19 Claims, 11 Drawing Sheets

(56) References Cited

U.S. PATENT DOCUMENTS

| | | | | | |
|---|---|---|---|---|---|
| 2019/0387481 | A1* | 12/2019 | Yang | ..................... | H04W 52/18 |
| 2020/0015250 | A1* | 1/2020 | Yang | ..................... | H04B 7/0619 |
| 2020/0053801 | A1* | 2/2020 | Hosseini | ............ | H04W 52/281 |
| 2020/0322971 | A1* | 10/2020 | Jung | ..................... | H04L 5/0064 |
| 2021/0006376 | A1* | 1/2021 | Cirik | ..................... | H04L 5/0094 |
| 2021/0105774 | A1* | 4/2021 | Oh | ..................... | H04W 72/0453 |
| 2022/0007399 | A1* | 1/2022 | Rastegardoost | ...... | H04L 5/0073 |
| 2022/0007404 | A1* | 1/2022 | Gou | ..................... | H04L 5/0055 |
| 2022/0061081 | A1* | 2/2022 | Jung | ..................... | H04L 1/187 |
| 2022/0116970 | A1* | 4/2022 | Gao | ................. | H04L 27/26025 |
| 2022/0159692 | A1* | 5/2022 | Lee | ..................... | H04L 5/0053 |
| 2022/0248395 | A1* | 8/2022 | Andersson | ........... | H04L 5/0055 |
| 2022/0256573 | A1* | 8/2022 | Frenne | ................. | H04W 72/23 |
| 2022/0271873 | A1* | 8/2022 | Gao | ..................... | H04L 1/1854 |
| 2022/0294591 | A1* | 9/2022 | Liu | ..................... | H04L 5/0053 |
| 2022/0295510 | A1* | 9/2022 | Behravan | ............. | H04W 72/21 |
| 2022/0303100 | A1* | 9/2022 | Yang | ..................... | H04L 1/1671 |
| 2022/0312440 | A1* | 9/2022 | Bagheri | ............. | H04W 72/044 |
| 2022/0337456 | A1* | 10/2022 | Kwak | ................. | H04L 25/0226 |
| 2022/0338217 | A1* | 10/2022 | Li | ......................... | H04W 72/23 |
| 2022/0376844 | A1* | 11/2022 | Muruganathan | ...... | H04W 72/23 |
| 2022/0377717 | A1* | 11/2022 | Park | ..................... | H04L 1/1896 |
| 2023/0006798 | A1* | 1/2023 | Lee | ..................... | H04L 1/1607 |
| 2023/0007648 | A1* | 1/2023 | Li | ..................... | H04W 72/044 |
| 2023/0130633 | A1* | 4/2023 | Babaei | ................. | H04L 1/1864 370/329 |
| 2023/0156738 | A1* | 5/2023 | Gao | ..................... | H04L 5/0053 370/330 |
| 2023/0275705 | A1* | 8/2023 | Muruganathan | ...... | H04L 1/1864 370/329 |
| 2023/0370130 | A1* | 11/2023 | Baldemair | ........... | H04L 1/1812 |
| 2023/0370211 | A1* | 11/2023 | Wang | ..................... | H04L 1/1864 |
| 2024/0178940 | A1* | 5/2024 | Baldemair | ........... | H04L 1/1812 |
| 2025/0220526 | A1* | 7/2025 | Jeon | ................. | H04W 72/0453 |
| 2025/0227702 | A1* | 7/2025 | Yamamoto | ........... | H04W 72/20 |

FOREIGN PATENT DOCUMENTS

| | | | | |
|---|---|---|---|---|
| CN | 107667556 A | 2/2018 | | |
| CN | 110535572 A | 12/2019 | | |
| WO | WO-2020029878 A1 * | 2/2020 | .......... | H04L 1/1861 |

OTHER PUBLICATIONS

LG Electronics, "Discussion on UL control with ultra-reliability", 3GPP TSG RAN WG1 RAN1 90bis, R1-1717964, Oct. 9-13, 2017, 5 pages.

NEC, "Design for structure of PUCCH in short duration", 3GPP TSG RAN WG1 Meeting #88bis, R1-1704602, Apr. 3-7, 2017, pp. 1-3.

"New SID Proposal: Study on New Radio Access Technology", 3GPP TSG RAN Meeting #71, RP-160671, Mar. 7-10, 2016, 8 pages.

NTT Docomo, Inc., "Revised WID on New Radio Access Technology", 3GPP TSG RAN Meeting #78, RP-172834, Dec. 18-21, 2017, 11 pages.

Huawei et al., "New SID on Physical Layer Enhancements for NR Ultra-Reliable and Low Latency Communication (URLLC)", 3GPP TSG-RAN#81, RP-182089, Sep. 10-13, 2018, 5 pages.

Huawei et al., "New WID: Physical Layer Enhancements for NR Ultra-Reliable and Low Latency Communication (URLLC)", 3GPP TSG RAN Meeting #83, RP-190654, Mar. 18-21, 2019, 5 pages.

3GPP, "Study on Scenarios and Requirements for Next Generation Access Technologies; (Release 14)", 3GPP TR 38.913 V14.3.0, Jun. 2017, pp. 1-39.

Huawei et al., "New WID: Physical Layer Enhancements for NR Ultra-Reliable and Low Latency Communication (URLLC)", 3GPP TSG RAN Meeting #83, RP-190726, Mar. 18-21, 2019, 5 pages.

Nokia et al., "New WID on enhanced Industrial Internet of Things (IoT) and URLLC support", 3GPP TSG RAN Meeting #86, RP-193233, Dec. 9-12, 2019.

Holma et al., "LTE for UMTS OFDMA and SC-FDMA Based Radio Access", John Wiley & Sons, 2009, 232 pages.

Sony, "Multiple HARQ-ACK PUSCH transmissions in a slot", 3GPP tsg_ran\wg1_r11,tsgr1_96b, Apr. 3, 2019, RI-1904235.

* cited by examiner

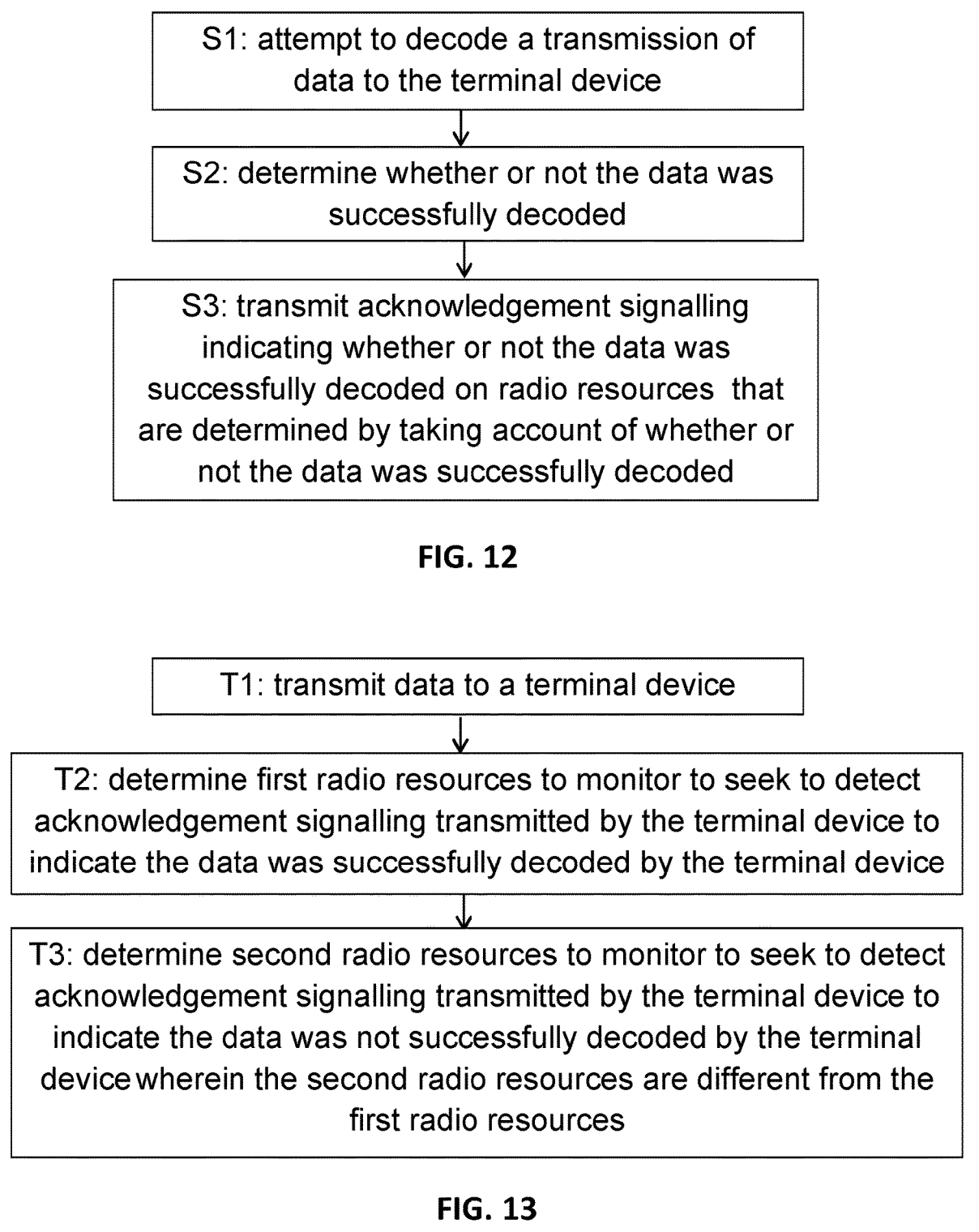

S1: attempt to decode a transmission of data to the terminal device

S2: determine whether or not the data was successfully decoded

S3: transmit acknowledgement signalling indicating whether or not the data was successfully decoded on radio resources that are determined by taking account of whether or not the data was successfully decoded

FIG. 12

T1: transmit data to a terminal device

T2: determine first radio resources to monitor to seek to detect acknowledgement signalling transmitted by the terminal device to indicate the data was successfully decoded by the terminal device T3: determine second radio resources to monitor to seek to detect acknowledgement signalling transmitted by the terminal device to indicate the data was not successfully decoded by the terminal device wherein the second radio resources are different from the first radio resources

FIG. 13

TELECOMMUNICATIONS APPARATUS AND METHODS

CROSS-REFERENCE TO RELATED APPLICATIONS

The present application is based on PCT filing PCT/EP2021/050920, filed Jan. 18, 2021, which claims priority to EP 20156393.9, filed Feb. 10, 2020, the entire contents of each are incorporated herein by reference.

BACKGROUND

Field

The present disclosure relates to wireless telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems are able to support a wider range of services than simple voice and messaging services offered by earlier generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected to efficiently support communications with an ever-increasing range of devices and data traffic profiles than existing systems are optimised to support. For example it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Other types of device, for example used for autonomous vehicle communications and for other critical applications, may be characterised by data that should be transmitted through the network with low latency and high reliability. A single device type might also be associated with different traffic profiles/characteristics depending on the application(s) it is running. For example, different considerations may apply for efficiently supporting data exchange with a smartphone when it is running a video streaming application (high downlink data) as compared to when it is running an Internet browsing application (sporadic uplink and downlink data) or being used in an online gaming scenario (data subject to stringent reliability and latency requirements).

In view of this there is expected to be a desire for future wireless communications networks, for example those which may be referred to as 5G or new radio (NR) systems/new radio access technology (RAT) systems, as well as future iterations/releases of existing systems, to efficiently support connectivity for a wide range of devices associated with different applications and different characteristic data traffic profiles and requirements.

Example use cases currently considered to be of interest for next and latest generation wireless communication systems include so-called Ultra Reliable and Low Latency Communications (URLLC)/enhanced Ultra Reliable and Low Latency Communications (eURLLC). See, for example, the 3GPP documents RP-160671, "New SID Proposal: Study on New Radio Access Technology," NTT DOCOMO, RAN #71 [1]; RP-172834, "Work Item on New Radio (NR) Access Technology," NTT DOCOMO, RAN #78 [2]; RP-182089, "New SID on Physical Layer Enhancements for NR Ultra-Reliable and Low Latency Communication (URLLC)," Huawei, HiSilicon, Nokia, Nokia Shanghai Bell, RAN #81 [3]; and RP-190654, "Physical layer enhancements for NR ultra-reliable and low latency communication (URLLC)," Huawei, HiSilicon, RAN #89, Shenzhen, China, 18 to 21 Mar. 2019 [4].

URLLC services are low latency and high reliability services (e.g. to support applications such as factory automation, transport industry, electrical power distribution etc.). URLLC services might, for example, aim to transmit data through a radio network with a target 32-byte packet transit time (i.e. time from ingress of a layer 2 packet to its egress from the network) of 1 ms (i.e. so that each packet needs to be scheduled and transmitted across the physical layer in a time that is shorter than 1 ms) with 99.999% reliability within the 1 ms target packet transit time [5], and there are recent proposals for this to be increased to 99.9999% with a latency between 0.5 ms and 1 ms.

The 3GPP project has recently completed a Release-16 Work Item on eURLLC [6] to specify features that require high reliability and low latency such as factory automation, transport industry, electrical power distribution, etc. in a 5G system. The eURLLC feature is further enhanced in Release-17 in a new Work Item [7], where one of the objectives is to enhance acknowledgment signalling (HARQ-ACK feedback) in respect of URLLC downlink transmissions.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 12 is a flow diagram schematically representing some operating aspects of a terminal device in accordance with certain embodiments of the disclosure; and FIG. 13 is a flow diagram schematically representing some operating aspects of a network access node in accordance with certain embodiments of the disclosure.

DETAILED DESCRIPTION OF THE EMBODIMENTS

Figure 1:
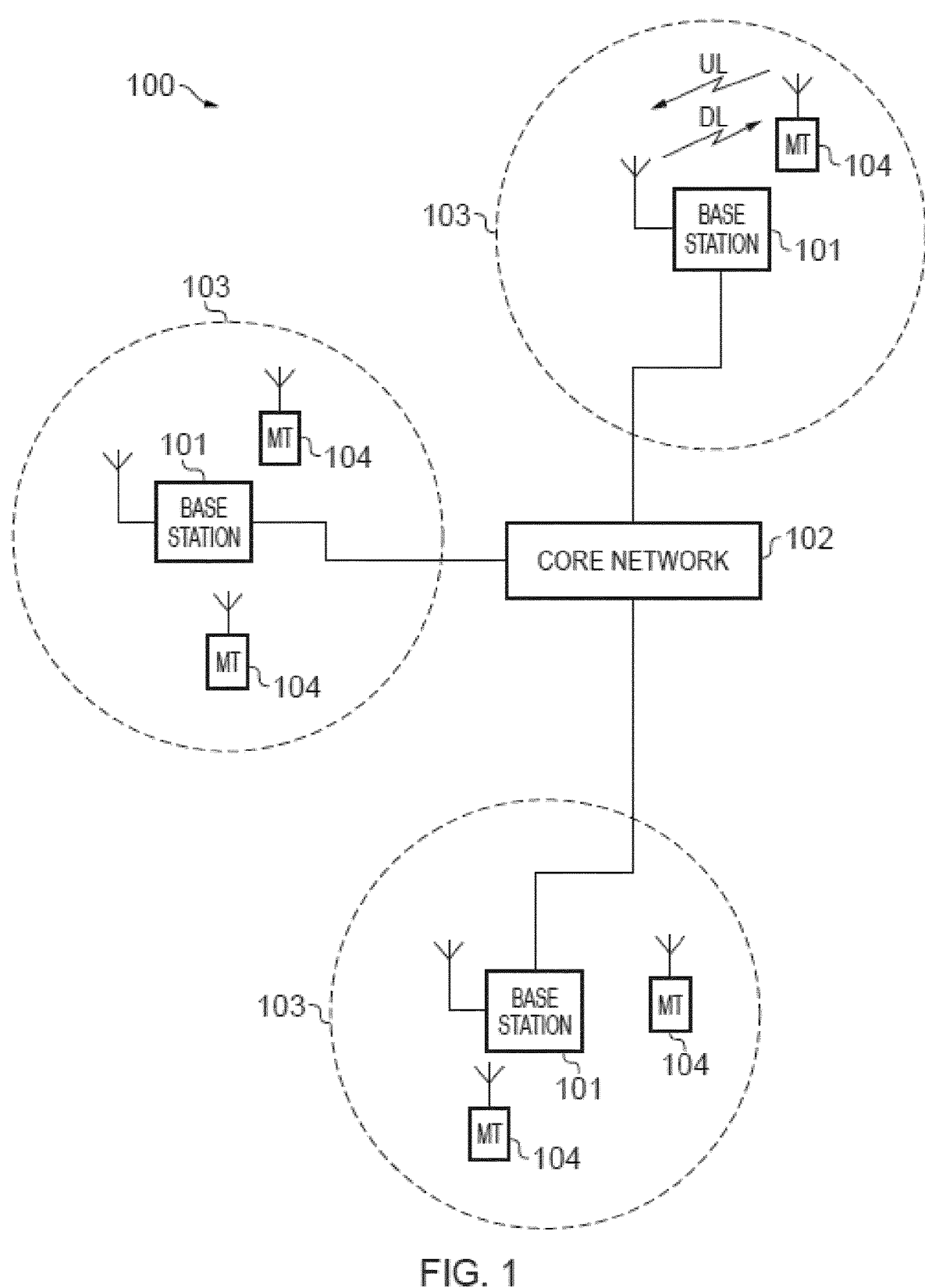
FIG. 1 schematically represents some aspects of an LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body and associated proposals, and also described in many books on the subject, for example, Holma H. and Toskala A [8]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 within which data can be communicated to and from terminal devices 104. Data is transmitted from base stations 101 to terminal devices 104 within their respective coverage areas 103 via a radio downlink. The coverage area may be referred to as a cell. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
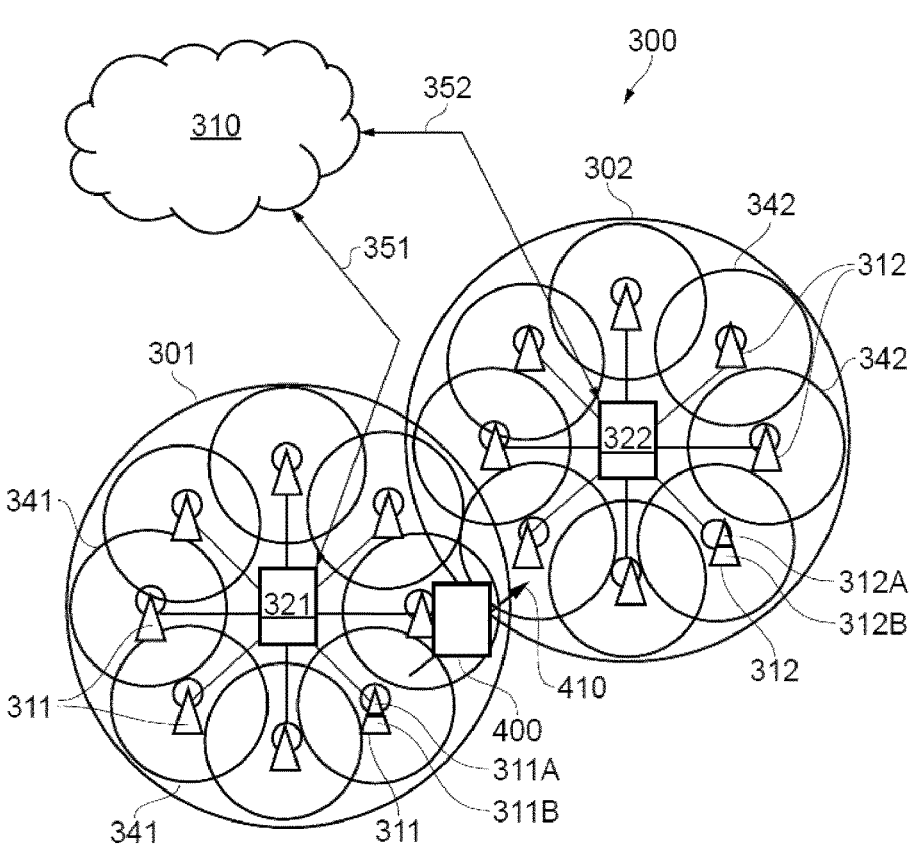
FIG. 2 schematically represents some aspects of a new radio access technology (RAT) wireless telecommunications network which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302. Each distributed unit 311, 312 includes transceiver circuitry 311*a*, 312*a* for transmission and reception of wireless signals and processor circuitry 311*b*, 312*b* configured to control the respective distributed units 311, 312.

In terms of broad top-level functionality, the core network component 310 of the telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations 101 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/ TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit/TRP. The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will typically depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (centralised unit/controlling unit) is transparent to the terminal device 400. That is to say, in some cases the terminal device may not be aware of which distributed unit is responsible for routing communications between the terminal device 400 and the controlling node 321 of the communication cell 301 in which the terminal device is currently operating. In such cases, as far as the terminal device is concerned, it simply transmits uplink data to the controlling node 321 and receives downlink data from the controlling node 321 and the terminal device has no awareness of the involvement of the distributed units 311. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2, and indeed in networks supporting aspects of different architectures in parallel, for example with co-existence of a legacy radio access network architecture, e.g., as schematically represented in FIG. 1, with a new RAT architecture, e.g., as schematically represented in FIG. 2. It will be appreciated the specific wireless telecommunications architecture in any given implementation is not of primary significance to the principles described herein. In this regard, certain embodiments of the disclosure may be described generally in the context of communications between network infrastructure equipment/access nodes and terminal devices, wherein the specific nature of the network infrastructure equipment/access nodes and terminal devices will depend on the specific network infrastructure for the implementation at hand. For example, in some scenarios the network infrastructure equipment/access nodes may comprise base stations, such as LTE-type base stations 101 as shown in FIG. 1, which are adapted to provide functionality in accordance with the principles described herein, and in other examples the network infrastructure equipment may comprise control units/controlling nodes 321, 322 and/or TRPs 311, 312 of the kind shown in FIG. 2 which are adapted to provide functionality in accordance with the principles described herein, and in yet other scenarios the network infrastructure equipment/access nodes may comprise both base stations, such as LTE-type base stations 101 as shown in FIG. 1 and control units/controlling nodes 321, 322 and/or TRPs 311, 312 of the kind shown in FIG. 2 with at least one being adapted to provide functionality in accordance with the principles described herein.

As discussed above, mobile communications networks such as the network 100 shown in FIG. 1 and the network 300 shown in FIG. 2 may support services with different characteristics, including services for which reliability, i.e. ensuring a high chance data can be successfully transmitted through the network, is a primary consideration, e.g., for URLLC. Certain embodiments of the disclosure propose approaches that seek to help support transmissions with reduced latency compared to existing approaches in communications networks, and in particular by proposing modified approaches for handing acknowledgement signalling in a wireless telecommunications network. In this regard, approaches in accordance with embodiments of the disclosure may in particular be described in the context of URLLC data (including eURLLC data), but it will be appreciated that while the more stringent requirements associated with new types of data in wireless telecommunications systems may be seen as a driver for improving reliability and reducing latency, a reduction in latency can be beneficial for any type of data for transmission in wireless telecommunications systems, whether classified as URLLC or similar data or otherwise.

Figure 3:
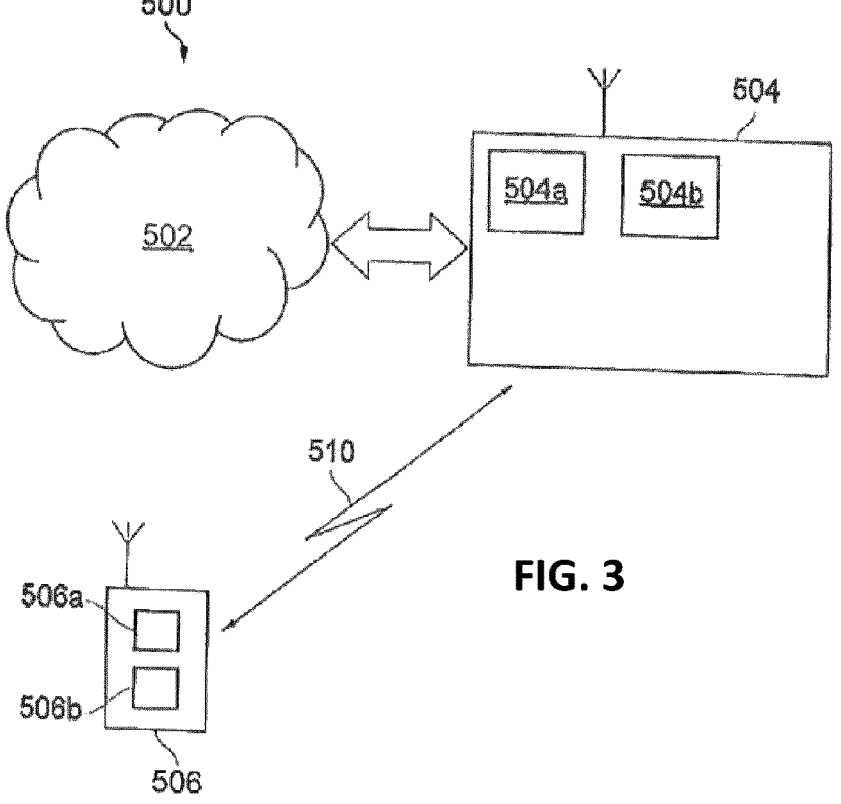
FIG. 3 shows a schematic representation of a telecommunications system in accordance with certain embodiments of the present disclosure.

FIG. 3 schematically shows some further details of a telecommunications system 500 supporting communications between a radio access node 504 and a terminal device 506 according to certain embodiments of the present disclosure. For the sake of an example, the telecommunications system 500 here is assumed to be based broadly around an LTE-type architecture that may also support other radio access technologies, either using the same hardware as represented in FIG. 3 with appropriately configured functionality, or separate hardware configured to operate in association with the hardware represented in FIG. 3. However, and as already noted, the specific network architecture in which embodiments of the disclosure may be implemented is not of primary significance to the principles described herein.

Many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current wireless telecommunications systems standards and other proposals for operating wireless telecommunications systems. The network access node 504 may, for convenience, sometimes be referred to herein as a base station 504, it being understood this term is used for simplicity and is not intended to imply any network access node should conform to any specific network architecture, but on the contrary, may correspond with any network infrastructure equipment/network access node that may be configured to provide functionality as described herein.

The telecommunications system 500 comprises a core network part 502 coupled to a radio network part. The radio network part comprises the radio network access node 504 and the terminal device 506. It will of course be appreciated that in practice the radio network part may comprise more network access nodes serving multiple terminal devices across various communication cells (e.g. as schematically represented in FIG. 1). However, only one network access node and one terminal device are shown in FIG. 3 in the interests of simplicity.

The terminal device 506 is arranged to communicate data to and from the network access node (base station/transceiver station) 504 or another network access node in the wireless telecommunications system according to coverage. The network access node 504 is communicatively connected to the core network part 502 which is arranged to perform routing and management of mobile communications services for terminal devices in the telecommunications system 500 via the network access node 504. The connection from the network access nodes 504 to the core network 502 may be wired or wireless. In order to maintain mobility management and connectivity, the core network part 502 also includes a mobility management entity, MME, which manages the service connections with terminal devices operating in the communications system, such as the terminal device 506. As noted above, the operation of the various elements of the communications system 500 shown in FIG. 3 may be in accordance with known techniques apart from where modified to provide functionality in accordance with embodiments of the present disclosure as discussed herein.

The terminal device 506 comprises transceiver circuitry 506*a* (which may also be referred to as a transceiver/transceiver unit) for transmission and reception of wireless signals and processor circuitry 506*b* (which may also be referred to as a processor/processor unit) configured to control the terminal device 506 to operate in accordance with embodiments of the present disclosure as described herein. The processor circuitry 506*b* for the terminal device may comprise various sub-units/sub-circuits for providing desired functionality as explained further herein. These sub-units may be implemented as discrete hardware elements or as appropriately configured functions of the processor circuitry. Thus the processor circuitry 506*b* may comprise circuitry which is suitably configured/programmed to provide the desired functionality described herein using conventional programming/configuration techniques for equipment in wireless telecommunications systems. The transceiver circuitry 506*a* and the processor circuitry 506*b* are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 506 will in general comprise various other elements associated with its operating functionality, for example a power source, user interface, and so forth, but these are not shown in FIG. 3 in the interests of simplicity.

The network access node 504 comprises transceiver circuitry 504*a* (which may also be referred to as a transceiver/transceiver unit) for transmission and reception of wireless signals and processor circuitry 504*b* (which may also be referred to as a processor/processor unit) configured to control the network access node 504 to operate in accordance with embodiments of the present disclosure as described herein. The processor circuitry 504*b* for the network access node may comprise various sub-units/sub-circuits for providing desired functionality as explained further herein. These sub-units may be implemented as discrete hardware elements or as appropriately configured functions of the processor circuitry. Thus the processor circuitry 504*b* may comprise circuitry which is suitably configured/programmed to provide the desired functionality described herein using conventional programming/configuration techniques for equipment in wireless telecommunications systems. The transceiver circuitry 504*a* and the processor circuitry 504*b* are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the network access node 504 will in general comprise various other elements associated with its operating functionality, such as a scheduler and so forth, but these are not shown in FIG. 3 in the interests of simplicity.

Thus, the network access node 504 is configured to communicate data with a terminal device 506 according to an embodiment of the disclosure over communication link 510.

Certain embodiments of the disclosure relate to apparatus and methods for handling acknowledgment signalling (e.g. HARQ-ACK signalling) in respect of transmissions of data in a wireless telecommunications system. Acknowledgment signalling is used in wireless telecommunications systems to indicate whether a transmission was successfully received or not. If the transmission was successfully received the receiving entity will send positive acknowledgment signalling (i.e. an ACK), and if the transmission was not successfully received the intended recipient entity will send negative acknowledgment signalling (i.e. a NACK). The term acknowledgment signalling will be used herein to refer collectively to both positive acknowledgment signalling (i.e. ACK) and negative acknowledgment signalling (i.e. NACK).

For scheduled transmission of data from a network access node (base station) to a terminal device in a wireless telecommunications system it is common for the network access node to first send control signalling, e.g. on a downlink control channel (such as a PDCCH—Physical Downlink Control Channel), comprising downlink control information (DCI) which indicates (grants) downlink radio resources that are to be used to transmit the data, e.g. on a downlink shared channel (such as a PDSCH). From this the terminal device can determine uplink radio resources to use to send uplink control information (UCI) comprising acknowledgment signalling in respect of the data, e.g. on an uplink control channel (such as a PUCCH), although it may also be on an uplink shared channel (such as a PUSCH). The terminal device then seeks to receive the data on the indicated radio resources on the downlink shared channel. If the terminal device successfully decodes the data it transmits a UCI on the determined uplink radio resources comprising an ACK indication, and if the terminal device does not successfully decode the data it transmits a UCI on the determined uplink radio resources comprising a NACK indication. This allows the network access node to determine if it should schedule a retransmission of the data.

So as to provide some particular examples, certain embodiments of the disclosure will be described herein in the context of acknowledgement signalling for downlink transmissions of URLLC data and using terminology, for example in respect of channel names such as PUCCH and PDSCH and signalling names, such as DCI and UCI, which are typically used in connection with current 3GPP wireless telecommunications systems. However, it will be appreciated this is only for convenience, and in general the approaches discussed herein are applicable for other service types and in wireless telecommunications systems which use different terminology (thus, references herein to PUCCH should, unless the context demands otherwise, be read as referring to a physical uplink control channel generally, and not specifically to a particular format of physical uplink control channel, and so on for other channels and terminology that may be referred to herein).

HARQ-ACK (Hybrid Automatic Repeat Request acknowledgement signalling) feedback is transmitted by a terminal device to a base station in respect of PDSCH scheduling to inform the base station whether the terminal device has successfully decoded the corresponding PDSCH or not. Radio resources in wireless telecommunications resources comprise a grid of resources (i.e. a radio frame structure) spanning frequency and time. The frequency dimension is divided into sub-carriers and the time dimension is divided into symbols that are grouped into slots.

In some current systems, for a PDSCH ending in slot n, the corresponding PUCCH carrying the HARQ-ACK acknowledgement signalling is transmitted in slot n+K$_1$, where the value of K$_1$ is indicated in the field "PDSCH-to-HARQ_feedback timing indicator" in the downlink (DL) Grant for the PDSCH (carried by DCI (downlink control information) Format 1_0 or DCI Format 1_1). Multiple (different) PDSCHs can point to the same slot for transmission of their respective HARQ-ACKs, and multiple HARQ-ACKs in the same slot can be multiplexed into a single PUCCH. Hence a PUCCH can contain multiple HARQ-ACKs for multiple PDSCHs. An example of this is represented FIG. 4.

Figure 4:
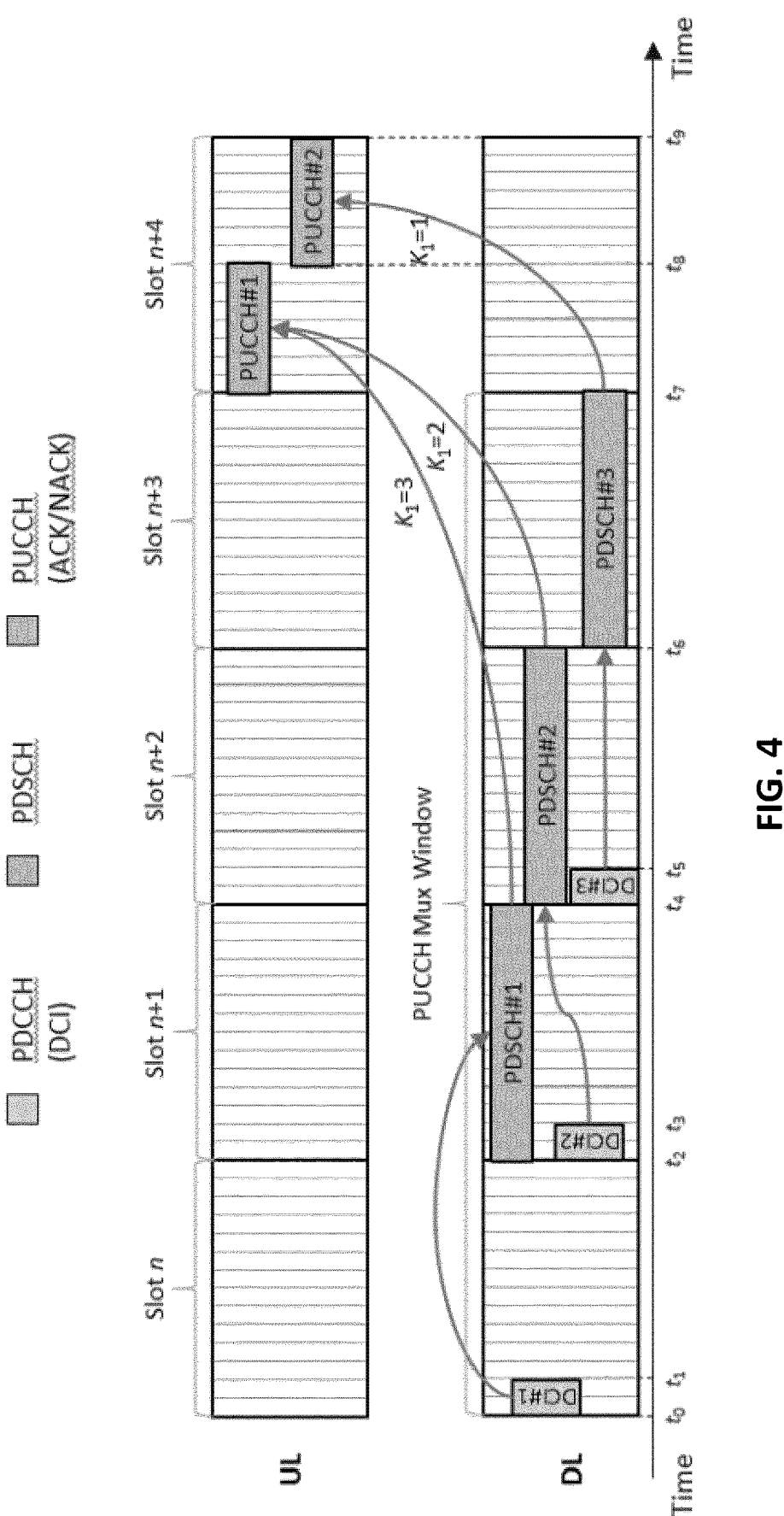
FIGS. 4 to 6 schematically show examples of radio resources associated with a terminal device in an uplink radio resource grid (top half of figure) and downlink radio resource grid (bottom half of figure) for a terminal device operating in accordance with previously proposed techniques.

FIG. 4 schematically shows an uplink radio resource grid (top half of figure) and downlink radio resource grid (bottom half of figure) representing radio resources in time (horizontal axis) and frequency (vertical axis). FIG. 4 schematically shows radio resources used by a terminal device in an example scenario during a period spanning five slots (identified in FIG. 4 as slots n to n+4). In slot n the terminal device receives downlink control information (DCI #1) indicating an allocation of radio resources on a physical downlink shared channel (PDSCH #1) in slot n+1 with a PDSCH-to-HARQ_feedback timing indicator value of K$_1$=3 and a "PUCCH Resource Indicator" (PRI) field indicating resources in the first half of the slot (i.e. PUCCH #1 in FIG. 4). In slot n+1 the terminal device receives downlink control information (DCI #2) indicating an allocation of radio resources on a physical downlink shared channel (PDSCH #2) in slot n+2 with a PDSCH-to-HARQ_feedback timing indicator value of K$_1$=2 and a PRI field indicating the same resources in the first half of the slot as for DCI #1 (i.e. PUCCH #1). In slot n+2 the terminal device receives downlink control information (DCI #3) indicating an allocation of radio resources on a physical downlink shared channel (PDSCH #3) in slot n+3 with a PDSCH-to-HARQ_feedback timing indicator value of K$_1$=1 and a PRI field indicating resources in the second half of the slot (i.e. PUCCH #2 in FIG. 4). Thus, in this particular example scenario, the HARQ-ACK feedbacks for each of the three downlink transmissions on the physical downlink shared channel are scheduled to be transmitted by the terminal device in slot n+4 and so can be transmitted in a multiplexed manner. To support this multiplexed HARQ-ACK function a Multiplexing Window may be defined, wherein the Multiplexing Window is a time window indicating how many PDSCHs can have their associated HARQ-ACK signalling multiplexed in PUCCH in a single slot and may depend on the range of K$_1$ values. In the example in FIG. 4, the PUCCH Multiplexing Window is assumed to be from Slot n to Slot n+3, which means the max K$_1$ value that can be used in this period is 4.

For the example represented in FIG. 4 there are two PUCCH indicated for the terminal device in slot n+4 (i.e. PUCCH #1 on symbols comprising the first half of the slot and PUCCH #2 on symbols comprising the second half of the slot). For wireless telecommunications systems operating in accordance with Release 15 of the 3GPP standards, only one PUCCH per slot is allowed to carry HARQ-ACKs for the same terminal device, even in the case of different indicated PUCCHs that do not overlap in time, as in FIG. 4. Thus, when a terminal device operating in accordance with Release 15 of the 3GPP standards is to multiplex HARQ-ACK signalling for multiple PDSCH it does so using the PUCCH resources indicated in the PRI associated with the last PDSCH in the PUCCH Multiplexing Window (since the terminal device will only know the total number of HARQ-ACK bits after last PDSCH is allocated). Thus, in the example in FIG. 4, DCI #1 and DCI #2 indicate PUCCH #1 for the HARQ-ACK signalling, but DCI #3 indicates PUCCH #2. Even though PUCCH #1 and PUCCH #2 do not overlap in time in this example, they cannot both be transmitted in the same slot according to Release 15 of the 3GPP standards. In this case, since DCI #3 schedules the last PDSCH, i.e. PDSCH #3, in the PUCCH Multiplexing Window, the terminal device will use PUCCH #2 to carry the multiplexed HARQ-ACK for PDSCH #1, PDSCH #2 and PDSCH #3. (It may be noted that PUCCH carrying other UCI, such as a Scheduling Request (SR) may be transmitted separately from a PUCCH carrying HARQ-ACK in the same slot if they do not overlap in time).

For Release 16 of the 3GPP standards the possibility of sub-slot operation for HARQ-ACK acknowledgement signalling was introduced. Sub-slot operation for HARQ-ACK allows the timings of HARQ-ACK UCI on PUCCH to be configured with a resolution which is less than one slot (i.e. the HARQ-ACK process operates with sub-slot timing granularity). Sub-slot based PUCCH thus allows more than one PUCCH carrying HARQ-ACKs to be transmitted within a slot. This provides for more opportunities for PUCCH carrying HARQ-ACK in respect of PDSCH transmissions to be transmitted within a slot, thereby potentially helping to reduce the latency of HARQ-ACK feedback. In a sub-slot based PUCCH, the granularity of the K$_1$ parameter (i.e. the time difference between the end of PDSCH and the start of its corresponding PUCCH) is in units of sub-slot instead of slot, where the sub-slot size can be 2 symbols or 7 symbols. An example of sub-slot HARQ-ACK operation is shown in FIG. 5.

Figure 5:
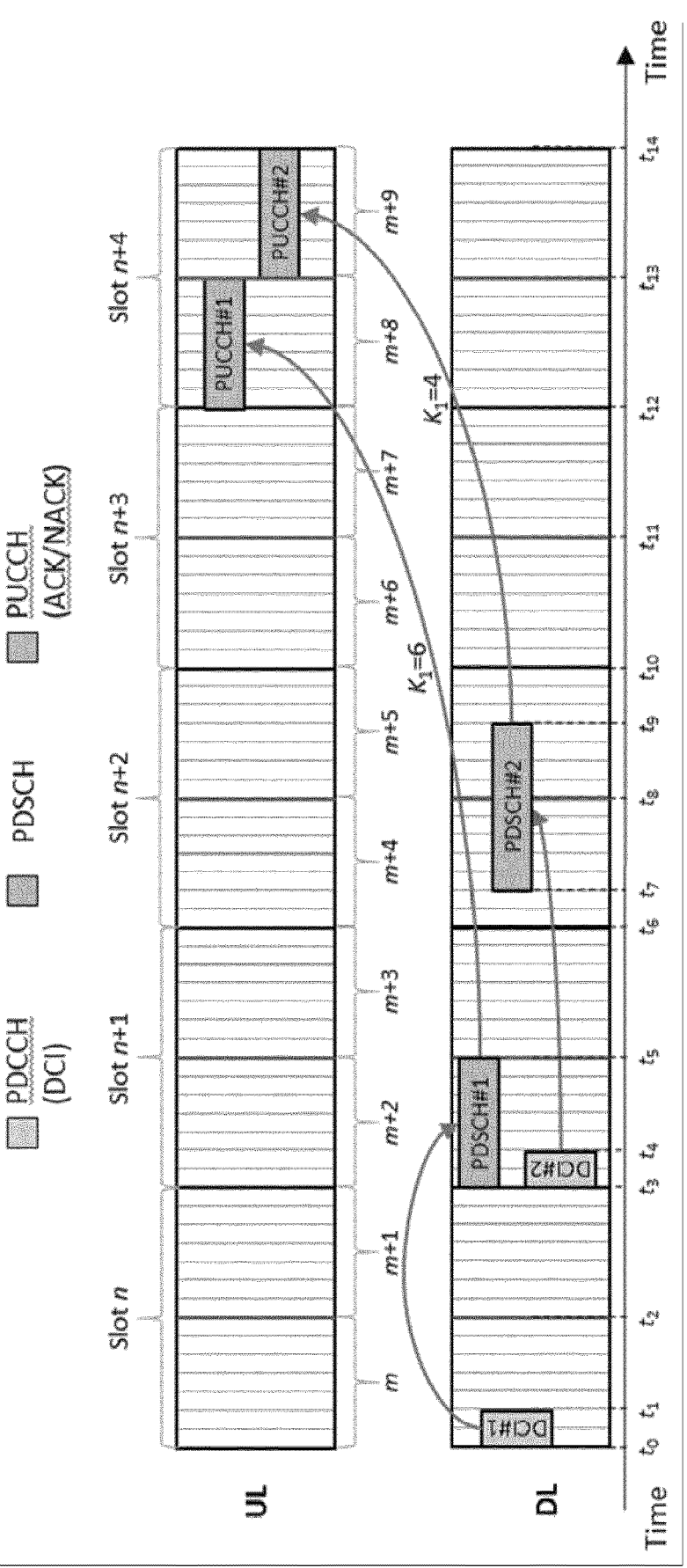

FIG. 5 is similar to, and will be understood from, FIG. 4, but this example schematically shows an uplink radio resource grid (top half of figure) and downlink radio resource grid (bottom half of figure) representing radio resources in time (horizontal axis) and frequency (vertical axis) in a scenario that support sub-slot operation for HARQ-ACK feedback with a sub-slot size of 7 symbols (i.e. half a slot in this case). Thus FIG. 5 schematically shows radio resources used by a terminal device in an example scenario during a period spanning five slots (identified in FIG. 5 as slots n to n+4)/ten sub-slots (identified in FIG. 5 as sub-slots m to m+9). In sub-slot m the terminal device receives downlink control information (DCI #1) indicating an allocation of radio resources on a physical downlink shared channel (PDSCH #1) in sub-slot m+2 with a PDSCH-to-HARQ_feedback timing indicator value of $K_1$=6. This means the terminal device determines the resources PUCCH #1 to use for transmitting acknowledgement signalling in respect of PDSCH #1 as indicated by the PRI associated with DC #1 in sub-slot m+8 (since this is the sub-slot which is $K_1$=6 sub-slots after the sub-slot in which PDSCH #1 ends). In sub-slot m+2 the terminal device receives downlink control information (DCI #2) indicating an allocation of radio resources on a physical downlink shared channel (PDSCH #2) that spans sub-slots m+4 and m+5 with a PDSCH-to-HARQ_feedback timing indicator value of $K_1$=4. This means the terminal device determines the resources PUCCH #2 to use for transmitting acknowledgement signalling in respect of PDSCH #2 as indicated by the PRI associated with DCI #2 in sub-slot m+9 (since this is the sub-slot which is $K_1$=4 sub-slots after the sub-slot in which PDSCH #2 ends). In contrast to approaches according to Release 15 of the 3GPP standards specification series, where only one PUCCH carrying HARQ-ACK is allowed in a slot, in a sub-slot based operation, a terminal device can transmit two PUCCH carrying HARQ-ACK (i.e. PUCCH #1 and PUCCH #2) in a slot.

For normal operation it can be expected most PDSCH transmissions will be successfully received on the first transmission and so the acknowledgement signalling will be positive (ACK) and there will be no need for any retransmissions of the data. However, in some cases, e.g. due to poor radio conditions, a PDSCH might not be successfully received on the first transmission and so the acknowledgement signalling will be negative (NACK) and there will need to be one or more retransmissions of the data before it can be decoded by the terminal device. An example is schematically shown in FIG. 6.

Figure 6:
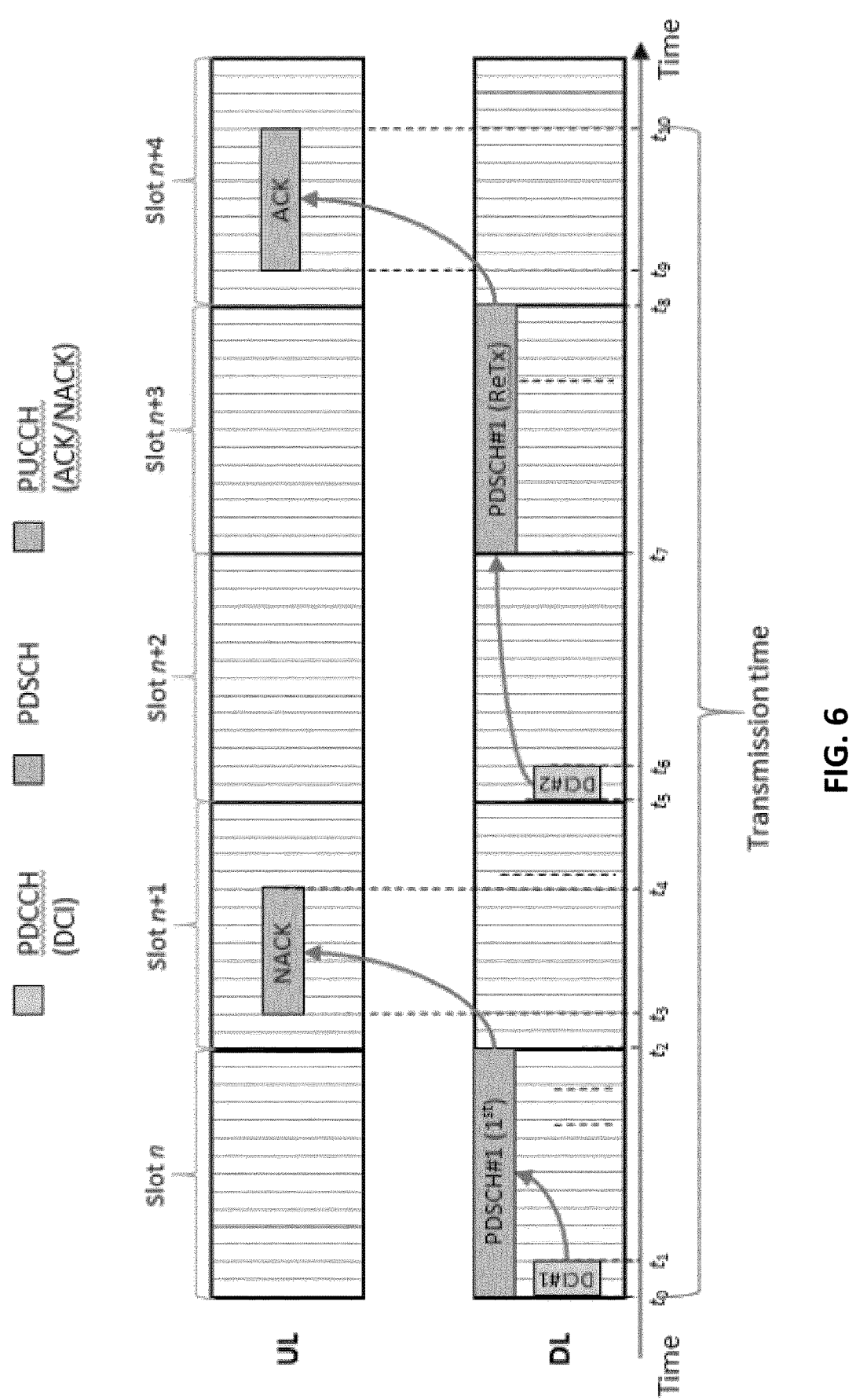

FIG. 6 schematically shows an uplink radio resource grid (top half of figure) and downlink radio resource grid (bottom half of figure) representing radio resources in time (horizontal axis) and frequency (vertical axis). FIG. 6 schematically shows radio resources used by a terminal device in an example scenario during a period spanning five slots (identified in FIG. 6 as slots n to n+4). This particular example scenario does not show sub-slot operation, but that is not significant to what is being shown. In slot n the terminal device receives downlink control information (DCI #1) indicating an allocation of radio resources on a physical downlink shared channel (PDSCH #1 (1st)) also in slot n and with a PDSCH-to-HARQ_feedback timing indicator value of $K_1$=1. This means the terminal device determines the acknowledgement signalling for the PDSCH #1 (1st) transmission should be sent in slot n+1 (since this is the slot which is $K_1$=1 slots after the slot containing the corresponding PDSCH #1 (1st) transmission) on resources in the slot corresponding to the PRI associated with DCI #1. In this example it is assumed the terminal device did not successfully decode the data in the PDSCH #1 (1st) transmission (e.g. due to poor radio conditions), and so the terminal device transmits negative acknowledgement signalling (NACK) on the relevant radio resources in the slot n+1, as schematically shown in FIG. 6. In response to receiving the NACK for the data transmitted in PDSCH #1 (1st), the base station serving the terminal device decides to retransmit the data.

Thus, in slot n+2 the terminal device receives downlink control information (DCI #2) indicating an allocation of radio resources to be used to retransmit the data on a physical downlink shared channel (PDSCH #1 (ReTx)) in slot n+3 and with a PDSCH-to-HARQ_feedback timing indicator value of $K_1$=1. This means the terminal device determines the acknowledgement signalling for the PDSCH #1 (ReTx) transmission should be sent in slot n+4 (since this is the slot which is $K_1$=1 slots after the slot containing the corresponding PDSCH #1 (ReTx) transmission) on resources in the relevant slot corresponding to the PRI associated with DCI #2. In this example it is assumed having received the retransmission of the data in the PDSCH #1 (ReTx) transmission the terminal device is able to successfully decode the data, e.g. by soft-combining the PDSCH #1 (1st) and PDSCH #1 (ReTx) transmissions, and so the terminal device transmits positive acknowledgement signalling (ACK) on the relevant radio resources in the slot n+4, as schematically shown in FIG. 6.

It will be appreciated that a need for PDSCH retransmission following negative acknowledgement of a previous transmission increases latency. Furthermore, the latency increases with larger values of the PDSCH-to-HARQ_feedback timing indicator value $K_1$. However, allowing larger values for the PDSCH-to-HARQ_feedback timing indicator value $K_1$ can be preferred because it can allow for more extensive use of multiplexing of acknowledgement signalling, which can help improve efficiency. This leads to a compromise having to be made between a desire for large values of the PDSCH-to-HARQ_feedback timing indicator value $K_1$ (to help support efficient multiplexing of acknowledgement signalling) and small values of the PDSCH-to-HARQ_feedback timing indicator value $K_1$ (to help reduce latency when a retransmission is needed). With this in mind the inventors have conceived of a new approach to handling acknowledgement signalling that seeks to reduce the potential impact of this compromise.

Thus, in accordance with certain embodiments of the disclosure a terminal device operating in a wireless telecommunications system may receive a transmission of data sent to the terminal device and subsequently send acknowledgement signalling indicating whether or not the terminal device was able to decode the data, wherein the time the acknowledgement signalling is sent depends on whether or not the terminal device was able to decode the data. Thus, if the terminal device was not able to decode the data it may send acknowledgement signalling sooner than if it were able to decode the data. This can therefore help by in effect supporting relatively low values of the PDSCH-to-HARQ_feedback timing indicator value $K_1$ in respect of negative acknowledgement signalling, for example to help towards reducing latency when a retransmission is needed, while also in effect supporting relatively high values of the PDSCH-to-HARQ_feedback timing indicator value $K_1$ in respect of positive acknowledgement signalling (which would normally be expected to be the majority of acknowledgement signalling), for example to help towards more efficient multiplexing of acknowledgement signalling.

Put another way, the basic idea of some embodiments of the disclosure is to use different PUCCH resources to transmit the "NACK" and the "ACK" HARQ feedback. If the terminal device successfully decodes the PDSCH it will transmit an "ACK" using a first PUCCH resource and if the terminal device fails to decode the PDSCH it will transmit a "NACK" using a second, different, PUCCH resource. In some examples the different PUCCH resource to use to transmit the "NACK" HARQ feedback may occur earlier than the PUCCH resource to use to transmit the "ACK" HARQ feedback. Thus if the terminal device fails to decode the PDSCH, it would transmit the "NACK" relatively soon rather than wait for its HARQ-ACK to be multiplexed into a later-scheduled PUCCH. This approach recognises that a "NACK" indicates a need for a retransmission of the PDSCH which would increase latency for the ultimate successful decoding of the PDSCH, and the latency can be reduced by sending the NACK sooner rather than later. A NACK that is sent early as compared to when it would have been sent were it an ACK may be referred to herein as a "Fast NACK". In some cases, as discussed further below, it may be determined to not send a Fast NACK but to instead send negative acknowledgement signalling on the same resources as would be used for positive acknowledgement signalling (or to send both) and this may be referred to as sending an Original NACK.

Figure 7:
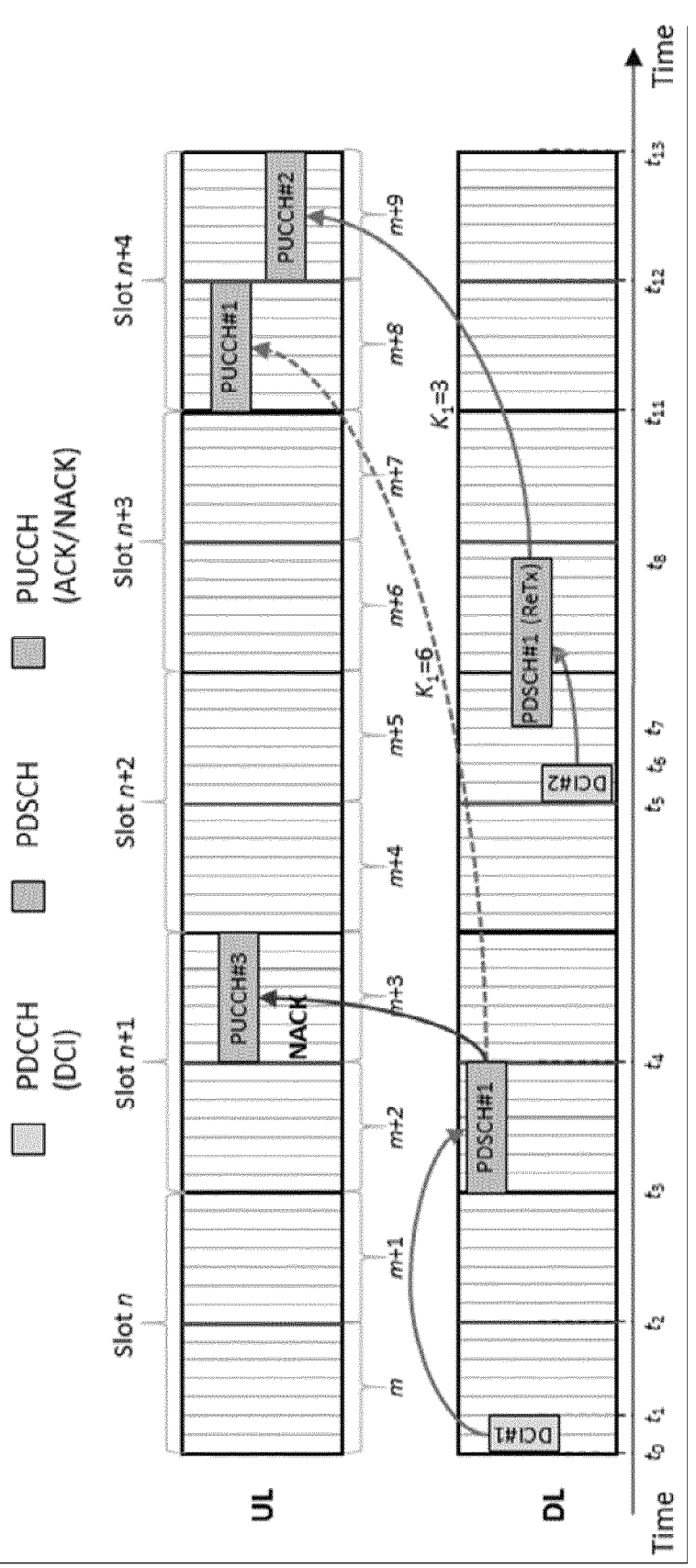
FIGS. 7 to 11 schematically show examples of radio resources associated with a terminal device in an uplink radio resource grid (top half of figure) and downlink radio resource grid (bottom half of Figure) for a terminal device operating in accordance with certain embodiments of the disclosure.

An example of a Fast NACK transmission approach is represented in FIG. 7.

FIG. 7 schematically shows an uplink radio resource grid (top half of figure) and downlink radio resource grid (bottom half of figure) representing radio resources in time (horizontal axis) and frequency (vertical axis) in a scenario that support sub-slot operation for HARQ-ACK feedback with a sub-slot size of 7 symbols. Thus FIG. 7 schematically shows radio resources associated with a terminal device in an example scenario during a period spanning five slots (identified as slots n to n+4)/ten sub-slots (identified as sub-slots m to m+9). In sub-slot m the terminal device receives downlink control information (DCI #1) indicating an allocation of radio resources on a physical downlink shared channel (PDSCH #1) in sub-slot m+2 with a PDSCH-to-HARQ_feedback timing indicator value of $K_1=6$. This means the terminal device determines the nominal resources to use for transmitting acknowledgement signalling in respect of PDSCH #1 are as indicated by PUCCH #1 in sub-slot m+8 (since this is the sub-slot which is $K_1=6$ sub-slots after the sub-slot in which PDSCH #1 ends). Here the reference to the nominal resources to use for transmitting acknowledgement signalling means the resources that would be used in accordance with known approaches, e.g. the approach represented in FIG. 5, for both positive acknowledgement signalling (ACK) and negative acknowledgement signalling (NACK), but which in accordance with embodiments of the disclosure is instead used for positive acknowledgement signalling (ACK) with negative acknowledgement signalling (NACK) being transmitted sooner. For the example scenario represented in FIG. 7 it is assumed that the terminal device fails to decode the data transmitted in PDSCH #1, for example due to poor radio conditions. Thus, in accordance with certain embodiments of the disclosure, rather than wait until sub-slot m+8 to transmit acknowledgement signalling in respect of PDSCH #1 using the determined nominal resources (i.e. following the dashed arrow from PDSCH #1 to PUCCH #1 in FIG. 7), the terminal device instead transmits the negative acknowledgment signalling earlier (sooner/faster), in this example in sub-slot m+3 on resources PUCCH #3, as schematically indicated in the figure by the solid arrow from PDSCH #1 to PUCCH #3 marked "NACK".

In response to receiving the NACK signalling in sub-slot m+3, the base station serving the terminal device determines that a retransmission of the data is needed. Thus, in sub-slot m+5 the base station transmits to the terminal device downlink control information (DCI #2) indicating an allocation of radio resources on a physical downlink shared channel (PDSCH #1 (ReTx)) that will contain a retransmission of the data from PDSCH #1 in sub-slot m+2 (in this example scenario the allocation of radio resources PDSCH #1 (ReTx) is schematically shown to be greater than the allocation PDSCH #1 used for the initial attempt to transmit the data, for example to allow for greater redundancy). The allocated transmission PDSCH #1 (ReTx) spans sub-slots m+5 and m+6, and DCI #2 in this example is assumed to be associated with a PDSCH-to-HARQ_feedback timing indicator value of $K_1=3$. This means the terminal device determines the nominal resources to use for transmitting acknowledgement signalling in respect of PDSCH #1 (ReTX) are as indicated by PUCCH #2 in sub-slot m+9 (since this is the sub-slot which is $K_1=3$ sub-slots after the sub-slot in which PDSCH #1 (ReTx) ends). For the example scenario represented in FIG. 7 it is assumed that after receiving PDSCH #1 (ReTx) the terminal device is then able to successfully decode the data, possibly after combining with what was received, but not successfully decoded, in PDSCH #1. Thus, in accordance with certain embodiments of the disclosure, the terminal device waits until sub-slot m+9 for the nominal resources to use for transmitting positive acknowledgement signalling in respect of PDSCH #1 (ReTx).

For ease of reference, for embodiments of the disclosure implementing approaches along the lines schematically represented in FIG. 7, the uplink control channel (e.g. PUCCH) associated with positive acknowledgement signalling on radio resources occurring at a first time and which may be determined in accordance with existing approaches (e.g. using a PDSCH-to-HARQ_feedback timing indicator value in an associated DCI) may sometimes be referred to as the "Original uplink control channel", (e.g. "Original PUCCH"). On the other hand, the uplink control channel (e.g. PUCCH) associated with negative acknowledgement signalling on radio resources occurring at a second time, which is different from the first time, may sometimes be referred to as the "Fast physical uplink control channel", (e.g. "Fast PUCCH"). Thus, for the example scenario shown in FIG. 7, PUCCH #1 is the Original PUCCH for PDSCH #1 (used for positive acknowledgement signalling) while PUCCH #3 is the Fast PUCCH for PDSCH #1 used for negative acknowledgement signalling).

As noted above, providing for the use of a Fast PUCCH for negative acknowledgement signalling can help reduce latency for data that needs to be retransmitted, while also retaining the Original PUCCH for positive acknowledgement signalling (which will typically be most common) allows for more efficient multiplexing of several HARQ-ACK feedback messages in a single PUCCH, which can help reduce overhead signalling and the overall number of PUCCH transmissions to be made, which can help reduce power consumption by terminal devices and radio interference/congestion on the uplink channel. Approaches in accordance with certain embodiments of the disclosure can thus help ensure acknowledgment signalling (i.e. HARQ-ACK) can be transmitted efficiently using the legacy method of multiplexing multiple HARQ-ACKs into a single PUCCH most of the time (i.e. for positive acknowledgement signalling), while also helping to ensure multiplexing multiple HARQ-ACKs into a single PUCCH does unduly increase latency for data that needs to be retransmitted (i.e. data associated with negative acknowledgement signalling).

Thus certain approaches of the disclosure provide a method of operating a terminal device in a wireless telecommunications system that comprises attempting to decode a transmission of data to the terminal device, determining whether or not the data was successfully decoded, and transmitting acknowledgement signalling indicating whether or not the data was successfully decoded at a time that is determined by taking account of whether or not the data was successfully decoded.

It may be expected that in general it will be determined that negative acknowledgment signalling should be transmitted earlier than positive acknowledgment signalling, but in some examples other factors may be taken into account.

In some examples a terminal device might determine to transmit a Fast NACK only if the delay between the PDSCH and the Original PUCCH is greater than a predetermined threshold $T_{NACK}$, and otherwise to use the Original PUCCH to send its "NACK" (i.e. to send an Original NACK). That is to say, in accordance with some embodiments the terminal device may determine to transmit acknowledgement signalling at the same time regardless of whether or not the data was successfully decoded if the period between the transmission of the data and the determined time for transmitting positive acknowledgement signalling is less than a predefined threshold period. This approach recognises that the Original PUCCH may in some cases be determined to be early enough to be used for negative acknowledgement signalling without unduly increasing latency. An example of this is shown in FIG. 8.

Figure 8:
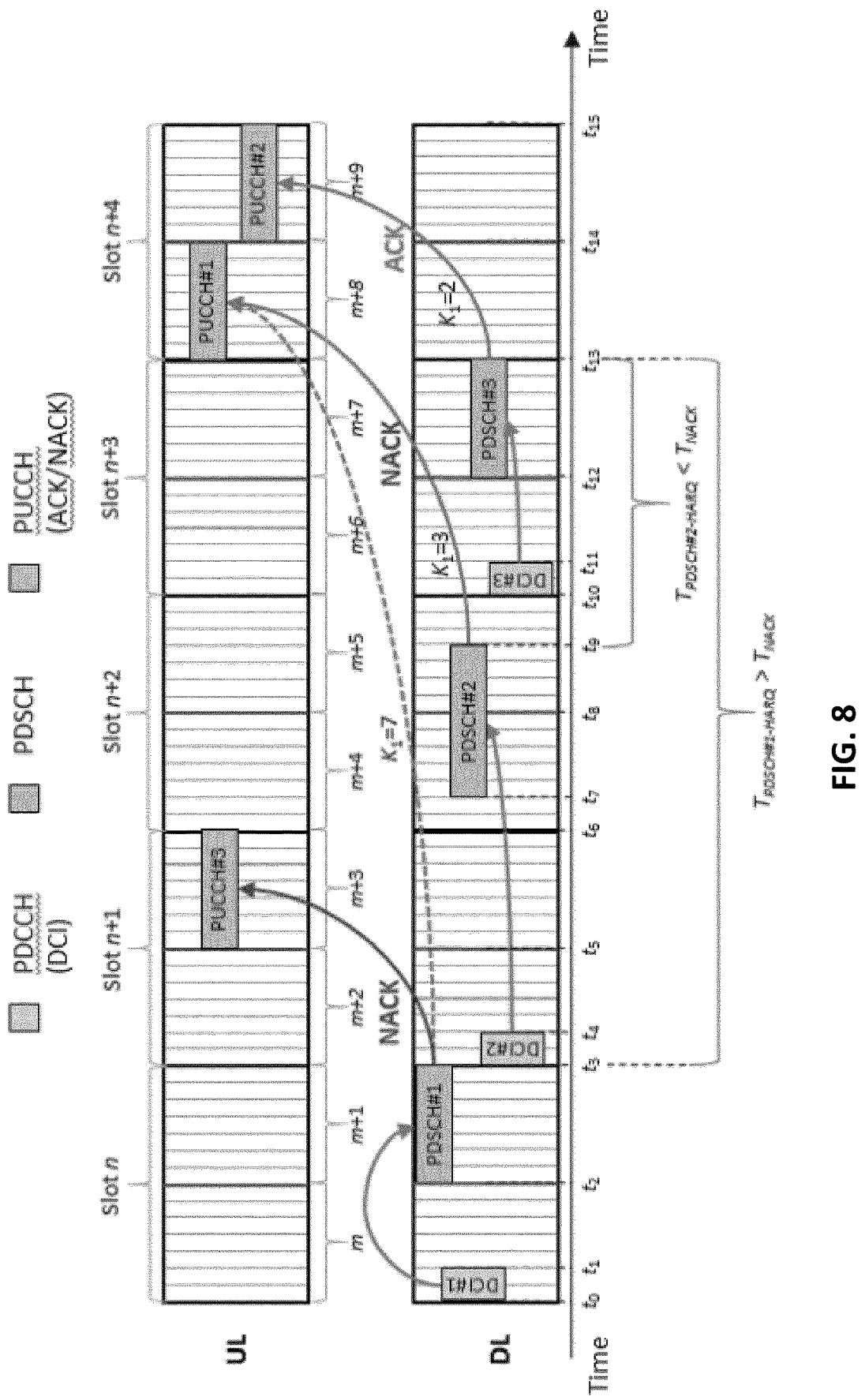

FIG. 8 is similar to, and will be understood from, FIG. 7, and again represents a scenario for a wireless telecommunications system which supports Fast NACK operation, but in which the terminal device may determine to transmit acknowledgement signalling at the same time regardless of whether or not the data was successfully decoded if the period between the transmission of the data (e.g. end of PDSCH) and the determined time for transmitting positive acknowledgement signalling (e.g. start of Original PUCCH) is less than a predefined threshold period $T_{NACK}$, which in this case is taken to be 2 slots. Thus, and as schematically represented in FIG. 8, DCI #1, DCI #2 and DCI #3 carry downlink grants which schedule PDSCH #1, PDSCH #2 and PDSCH #3 respectively. For this scenario it is assumed DCI #1 is associated with a PDSCH-to-HARQ_feedback timing indicator value of $K_1$=7, DCI #2 is associated with a PDSCH-to-HARQ_feedback timing indicator value of $K_1$=3, and DCI #3 is associated with a PDSCH-to-HARQ_feedback timing indicator value of $K_1$=2. Thus acknowledgment signalling for PDSCH #1 and PDSCH #2 is nominally scheduled to be multiplexed on PUCCH #1 while acknowledgment signalling for PDSCH #3 is nominally scheduled to be multiplexed on PUCCH #2.

For the example scenario represented in FIG. 8 it is assumed the terminal device successfully decodes PDSCH #3 but fails to decode PDSCH #1 and PDSCH #2. Consequently, the terminal device sends "NACK" for PDSCH #1 and PDSCH #2. However, rather than wait until PUCCH #1 to transmit the NACK in respect of PDSCH #1, the terminal device instead sends a Fast NACK on PUCCH #3 in accordance with the principles disclosed herein (since the time between PDSCH #1 and its nominal/Original PUCCH (PUCCH #1) (labelled $T_{PDSCH\ \#1-HARQ}$ in FIG. 8) is greater than the threshold $T_{NACK}$). However, the time between PDSCH #2 and its nominal/Original PUCCH (again PUCCH #1) (labelled $T_{PDSCH\ \#2-HARQ}$ in FIG. 8), is less than the threshold value of $T_{NACK}$ (2 slots), and so the terminal device sends a legacy/Original NACK using the Original PUCCH resource, i.e. PUCCH #1.

While in the above example the predetermined threshold period $T_{NACK}$ is a predetermined amount of time (e.g. 2 slots in this case), in other examples, the predetermined threshold period $T_{NACK}$ may be defined in units corresponding to the duration of the PDSCH-to-HARQ_feedback timing indicator value of $K_1$. The granularity of $K_1$ may, for example, vary from units of slot and sub-slot (and sub-slots may be 2 OFDM symbols or 7 OFDM symbols). Thus with an approach in which the predetermined threshold period $T_{NACK}$ may be defined in units of $K_1$, the terminal device may simply compare the $K_1$ value indicated in the field "PDSCH-to-HARQ_feedback timing indicator" of the downlink grant for a data transmission on PDSCH with the threshold $T_{NACK}$, to determine whether to transmit a Fast NACK or not.

In some examples a terminal device might determine to transmit a Fast NACK only if the delay between the DCI scheduling PDSCH and the Original PUCCH is greater than a predetermined threshold $T_{NACK-DCI}$, and otherwise to use the Original PUCCH to send its "NACK" (i.e. to send an Original NACK). That is to say, in accordance with some embodiments the terminal device may determine to transmit acknowledgement signalling at the same time, e.g. the time of the Original PUCCH radio resources, regardless of whether or not the data was successfully decoded if the period between the transmission of the DCI scheduling the data and the determined time for transmitting positive acknowledgement signalling is less than a predefined threshold period. This approach again recognises that the Original PUCCH may in some cases be determined to be early enough to be used for negative acknowledgement signalling without unduly increasing latency from when data arrives at Layer 2 (i.e. when also accounting for delays associated with sending the downlink grant). An example of this is shown in FIG. 9.

Figure 9:
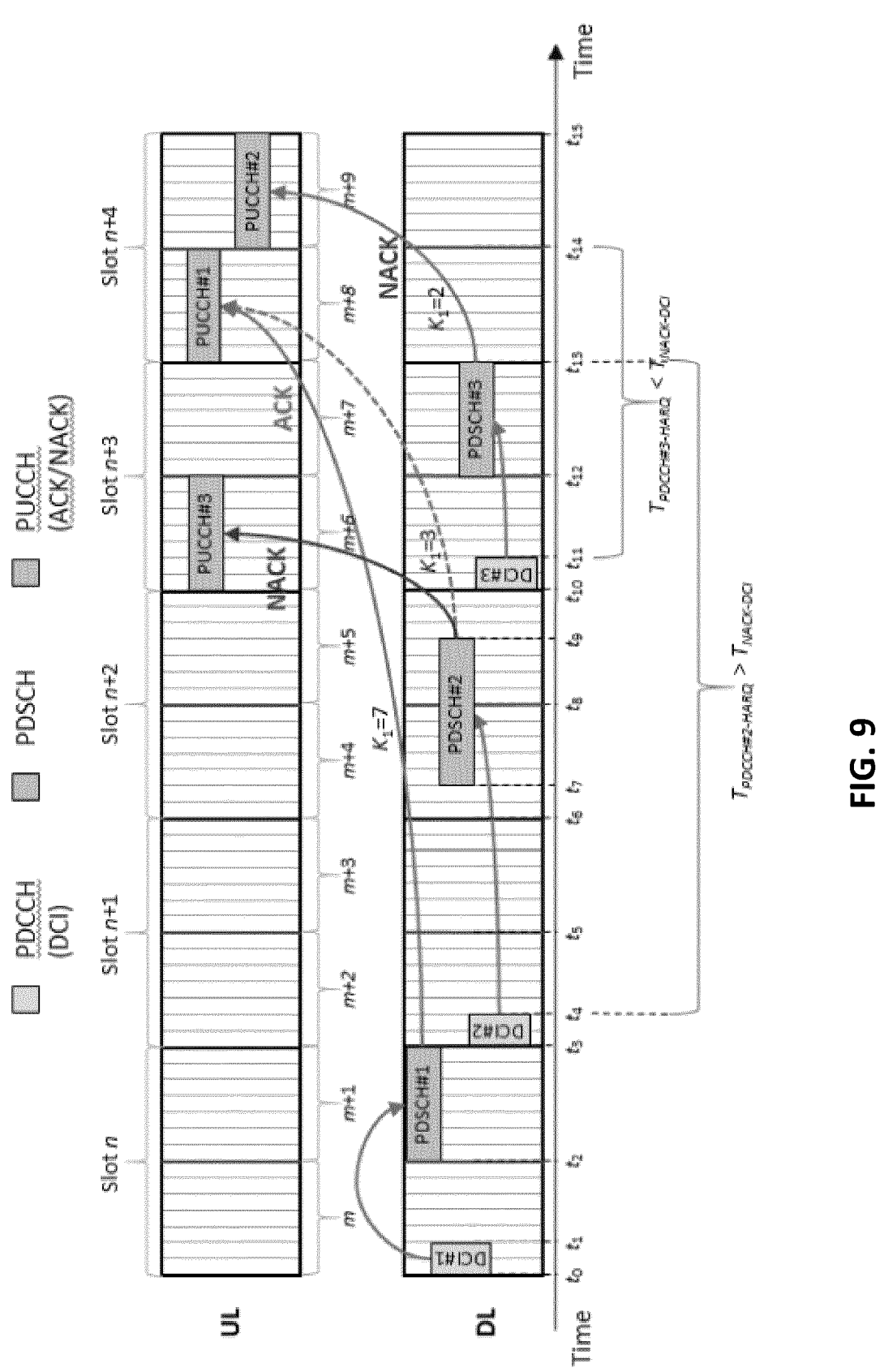

FIG. 9 is similar to, and will be understood from, FIG. 7, and again represents a scenario for a wireless telecommunications system which supports Fast NACK operation, but in which the terminal device may determine whether to transmit acknowledgement signalling at the same time regardless of whether or not the data was successfully decoded if the period between the transmission of downlink control information scheduling a transmission of data (e.g. end of DCI) and the determined time for transmitting positive acknowledgement signalling (e.g. start of Original PUCCH) is less than a predefined threshold period $T_{NACK-DCI}$, which in this case is taken to be 2 slots. Thus, DCI #1, DCI #2 and DCI #3 carry downlink grants which schedule PDSCH #1, PDSCH #2 and PDSCH #3 respectively. As indicated in FIG. 9, for this scenario it is assumed DCI #1 is associated with a PDSCH-to-HARQ_feedback timing indicator value of $K_1$=7, DCI #2 is associated with a PDSCH-to-HARQ_feedback timing indicator value of $K_1$=3, and DCI #3 is associated with a PDSCH-to-HARQ_feedback timing indicator value of $K_1$=2. Thus acknowledgment signalling for PDSCH #1 and PDSCH #2 is nominally scheduled to be multiplexed on PUCCH #1 while acknowledgment signalling for PDSCH #3 is nominally scheduled to be multiplexed on PUCCH #2.

For the example represented in FIG. 9 is it assumed the terminal device successfully decodes PDSCH #1 but fails to decode PDSCH #2 and PDSCH #3. Consequently the terminal device sends "NACK" for PDSCH #2 and PDSCH #3. However, rather than wait until PUCCH #1 to transmit the NACK in respect of PDSCH #2, the terminal device instead sends a Fast NACK on PUCCH #3 in accordance with the principles disclosed herein (since the time between DCI #2 and the associated nominal/Original PUCCH (PUCCH #1) for the PDSCH #2 scheduled by DCI #2 (labelled $T_{PDSCH\ \#2\text{-}HARQ}$ in FIG. 9) is greater than the threshold $T_{NACK\text{-}DCI}$). However, the time between DCI #3 and the associated nominal/Original PUCCH (again PUCCH #2) (labelled $T_{PDSCH\ \#3\text{-}HARQ}$ in FIG. 9), is less than the threshold value of $T_{NACK\text{-}DCI}$ (2 slots), and so the terminal device sends a legacy/Original NACK using the Original PUCCH resource, i.e. PUCCH #2.

In some examples the terminal device may receive in association with downlink control information scheduling downlink data an indication of whether or not the terminal device should use a Fast NACK approach in the event the terminal device does not successfully decode the data. That is to say, the terminal device may determine to transmit acknowledgement signalling at the same time regardless of whether or not the data was successfully decoded in response to determining a transmission of downlink control information scheduling the transmission of the further data is comprises a predefined characteristic to indicate this.

The predefined characteristic may, for example, be an explicit new field defined in the downlink grant DCI, e.g. a 1 bit indicator, or the characteristic may be implicitly indicated using an existing field. It should be noted an indication that the terminal device may use Fast NACK does not mean the terminal device will necessarily use the Fast PUCCH resource. Rather, according to certain embodiments of the disclosure, the terminal device will only use the Fast PUCCH resource if it has a "NACK" to transmit, otherwise (i.e. if it has an "ACK") it uses the Original PUCCH resource.

In other examples, whether a Fast NACK approach may be used may be configured by radio resource control, RRC, signalling transmitted by the network.

In some examples, either of the pre-defined threshold periods $T_{NACK}$ and $T_{NACK\text{-}DCI}$ may be configured by radio resource control, RRC, signalling transmitted by the network and/or may be fixed in by specification.

In another embodiment, whether a Fast NACK approach is available to be used may be determined by whether a Fast PUCCH is indicated in a DCI. For example, according to some implementations, whether a terminal device uses a scheduled Fast PUCCH to report NACK when the Fast PUCCH resource is scheduled by a DCI and the PDSCH is not successfully decoded. Otherwise, the terminal device uses an Original PUCCH resource.

Thus, a terminal device operating in accordance with certain embodiments of the disclosure may transmit acknowledgement signalling indicating whether or not the data was successfully decoded on radio resources that are determined by taking account of whether or not the data was successfully decoded. Thus, for a given transmission of data to the terminal device, the terminal device may transmit acknowledgement signalling on first radio resources at a first time if the acknowledgement signalling is positive and may transmit acknowledgement signalling on second radio resources at a second time if the acknowledgement signalling is negative. A network access node serving the terminal device may thus be configured to monitor for acknowledgement signalling in respect of a given transmission of data to the terminal device on two different sets of radio resources. Thus certain embodiments of the disclosure provide methods of operating network infrastructure equipment in a wireless telecommunications system (and corresponding apparatus for use in a wireless telecommunications system), which include transmitting data to a terminal device and attempting, at a first time, to detect acknowledgement signalling transmitted by the terminal device to indicate the data was successfully decoded by the terminal device; and attempting, at a second time, to detect acknowledgement signalling transmitted by the terminal device to indicate the data was not successfully decoded by the terminal device; wherein the second time is earlier than the first time.

In accordance with some examples the radio resources to use for transmitting positive acknowledgement signalling may be determined in accordance with conventional techniques, while the resources to use for transmitting negative acknowledgement signalling may be determined in various different ways.

In some examples the downlink control information allocating the radio resources to which the acknowledgement signalling relates may include an indication of the radio resources (i.e. Fast PUCCH resources) to use for transmitting the acknowledgement signalling in the event it is negative (i.e. a Fast NACK).

For example, the Fast PUCCH (i.e. the resources to use for negative acknowledgement signalling) may be independently indicated in the relevant DCI in addition to the Original PUCCH (i.e. the resources to use for positive acknowledgement signalling). This indication may in some cases be in the same way as the Original PUCCH is indicated, e.g. by a PDSCH-to-HARQ_feedback timing indicator field to indicate the relevant sub-slot/slot and a "PUCCH Resource Indicator (PRI)" field to indicate the resources within the relevant sub-slot/slot which define the Fast PUCCH in addition to corresponding fields that define the original PUCCH. Put another way, a terminal device may be scheduled with two different PUCCH resources for ACK and NACK transmissions respectively in one downlink grant message (DCI). In some cases the same "PDSCH-to-HARQ_feedback timing indicator" or "PUCCH Resource Indicator (PRI)" can be common for both the Fast PUCCH and the original PUCCH (but may be interpreted differently to indicate different resources for Fast PUCCH and Original PUCCH respectively).

In some cases the Fast PUCCH (i.e. the resources to use for negative acknowledgement signalling) may be indicated in the relevant DCI in association with the Original PUCCH (i.e. the resources to use for positive acknowledgement signalling).

For example, the radio resources to use for transmitting acknowledgement signalling indicating the data was not successfully decoded and the radio resources to use for transmitting acknowledgement signalling indicating the data was successfully decoded might both be indicated by a value for a common field in the downlink control information, for example in accordance with a predefined look-up table.

In some cases the common field in the downlink control information may be a PDSCH-to-HARQ_feedback timing indicator field used to indicate the relevant sub-slot/slot for each of the Fast PUCCH and the Original PUCCH, and the resources within each of the relevant sub-slots/slots may be as indicated by a single PUCCH Resource Indicator (PRI) indicator field for the relevant DCI. Thus two predefined sets of $K_1$ values may be associated with each value for the PDSCH-to-HARQ_feedback timing indicator field, with one applying for positive acknowledgement signalling (i.e. defining the Original PUCCH) and one applying for negative acknowledgement signalling (i.e. defining the Fast PUCCH). One example predefined association between values in a conventional PDSCH-to-HARQ_feedback timing indicator field and $K_1$ values to apply for each of positive acknowledgement signalling and negative acknowledgement signalling is shown in Table 1. In this case there are 2 bits configured to indicate the value for the PDSCH-to-HARQ_feedback timing indicator field (typically wireless telecommunications systems will allow for up to 3 bits to be configured for this field). Thus in accordance with this approach, if the terminal device fails to decode the PDSCH, i.e. needs to send a "NACK", it will use the Fast PUCCH value for $K_1$ (right hand column in Table 1) corresponding to the value of the PDSCH-to-HARQ_feedback timing indicator field in the relevant DCI (the potential values for this being indicated in the right hand column in Table 1). However, if the terminal device correctly decodes the PDSCH, i.e. needs to send an "ACK", it will use the Original PUCCH value for $K_1$ (middle column in Table 1) corresponding to the value of the PDSCH-to-HARQ_feedback timing indicator. In this example the predefined association between PDSCH-to-HARQ_feedback timing indicator field and $K_1$ values to apply for each of positive acknowledgement signalling and negative acknowledgement signalling includes an entry (i.e. when "PDSCH-to-HARQ_feedback timing indicator"="00") which in effect instructs the terminal device to not use Fast NACK and to use the Original PUCCH regardless of whether a "NACK" or an "ACK" is to be sent.

TABLE 1

Different sets of $K_1$ values for Original PUCCH and Fast PUCCH

| PDSCH-to-HARQ_feedback timing indicator | K1 | |
| --- | --- | --- |
| | Original PUCCH (ACK) | Fast PUCCH (NACK) |
| 00 | 1 | Not Used |
| 01 | 4 | 1 |
| 10 | 6 | 1 |
| 11 | 10 | 2 |

The mappings (predefined associations) between PDSCH-to-HARQ_feedback timing indicator values and values of $K_1$ for each of Original PUCCH (ACK) and Fast PUCCH (NACK) could, for example, be configured using RRC signalling or may be defined in an operating standard for the wireless telecommunications system.

In some embodiments, either as an alternative to, or in conjunction with, approaches discussed above in relation to Table 1, the granularity for $K_1$ to apply when determining the time delay from the PDSCH to the corresponding PUCCH may be different for Original PUCCH and Fast PUCCH. In this regard the granularity for $K_1$ may be considered to be the length of the PUCCH sub-slot or slot depending on configuration through RRC signalling. For example, $K_1$ for Original PUCCH may be set in units of sub-slots of length 7 symbols, whereas $K_1$ for Fast PUCCH may be set in units of sub-slots of length 2 symbols. The $K_1$ granularity to apply for each of ACK and NACK can be signalled by the network using RRC signalling or dynamically indicated using DCI for the relevant transmission of data to the terminal device, or may be defined in an operating standard for the wireless telecommunications system.

In some cases the common field in the downlink control information may be a PUCCH Resource Indicator (PRI) field used to indicate a PUCCH Resource ID value for the radio resources to use for each of the Fast PUCCH and the Original PUCCH (the PRI indicates which PUCCH Resource ID in a PUCCH Resource Set the terminal device should use for its HARQ-ACK feedbacks). Thus two predefined sets of PUCCH Resource ID values may be associated with each value for the PUCCH Resource Indicator (PRI) field, with one applying for positive acknowledgement signalling (i.e. defining the Original PUCCH) and one applying for negative acknowledgement signalling (i.e. defining the Fast PUCCH). One example predefined association between values in a conventional PUCCH Resource Indicator (PRI) field and PUCCH Resource ID values to apply for each of positive acknowledgement signalling and negative acknowledgement signalling is shown in Table 2. In this case there are 3 bits configured to indicate the value for the PUCCH Resource Indicator (PRI) field. Thus in accordance with this approach, if the terminal device fails to decode the PDSCH, i.e. needs to send a "NACK", it will use the Fast PUCCH value for the PUCCH Resource ID (right hand column in Table 2) corresponding to the value of the PUCCH Resource Indicator (PRI) field in the relevant DCI (the potential values for this being indicated in the right hand column in Table 2). However, if the terminal device correctly decodes the PDSCH, i.e. needs to send an "ACK", it will use the Original PUCCH value for the PUCCH Resource ID (middle column in Table 2) corresponding to the value of the PUCCH Resource Indicator (PRI) in the relevant DCI. In this example the predefined association between PUCCH Resource Indicator (PRI) field and PUCCH Resource ID values to apply for each of positive acknowledgement signalling and negative acknowledgement signalling includes two entries (i.e. when "PUCCH Resource Indicator (PRI)"="000" or "001") which in effect instructs the terminal device to not use Fast NACK and to use the Original PUCCH regardless of whether a "NACK" or an "ACK" is to be sent.

TABLE 2

Different sets of PUCCH Resource ID values for Original PUCCH and Fast PUCCH

| PUCCH Resource Indicator (PRI) | PUCCH Resource ID | |
| --- | --- | --- |
| | Original PUCCH (ACK) | Fast PUCCH (NACK) |
| 000 | 0 | Not Used |
| 001 | 1 | Not Used |
| 010 | 2 | 0 |
| 011 | 3 | 0 |
| 100 | 4 | 1 |
| 101 | 5 | 1 |
| 110 | 6 | 3 |
| 111 | 7 | 3 |

The mappings (predefined associations) between PUCCH Resource Indicator (PRI) values and values of PUCCH Resource ID for each of Original PUCCH (ACK) and Fast PUCCH (NACK) could, for example, be configured using RRC signalling or may be defined in an operating standard for the wireless telecommunications system.

In some examples the Fast PUCCH resource may be derivable from the Original PUCCH from information which is conveyed to the terminal device in RRC signalling or defined in an operating standard for the wireless telecommunications system. For example in some examples a predefined offset between a data transmission on PDSCH and a Fast PUCCH to use if the data is not successfully decoded may be semi-statically configured in radio resource control signalling or defined by standard. The radio resources to use at the relevant time may then correspond to what is indicated in the PUCCH Resource Indicator (PRI) field in the scheduling DCI for the data transmission on PDSCH or may be defined in an operating standard for the wireless telecommunications system.

In some examples the Fast NACK may pre-empt (i.e. take the place of) an Original PUCCH resource relating to an earlier transmission of data to the terminal device. That is to say, the Fast PUCCH may pre-empt an existing Original PUCCH transmission if there is a collision. This reflects that a Fast PUCCH resource may be considered to have priority over an Original PUCCH. In this case the network infrastructure equipment serving the terminal device may be configured to assume the acknowledgement signalling relating to the earlier transmission of data to the terminal device should be considered to comprise positive acknowledgment signalling (all ACKs). This assumption recognises that NACKs are relatively rare, and if the earlier transmission of data to the terminal device had not been successfully decoded, then a Fast NACK would have previously been sent in respect of this. In this case, the Fast ACK acknowledgement signalling may be transmitted with a predefined characteristic to indicate it has been sent instead of acknowledgement signalling relating to an earlier transmission of data so the network infrastructure equipment serving the terminal device can detect this has happened. For example, the Fast NACK may be scrambled by a predefined scrambling sequence.

In some cases multiple "NACKs" for different PDSCH in the same terminal device can be multiplexed in a single Fast PUCCH resource.

In some examples there may be an overlap in Fast PUCCH resources for multiple terminal devices. In this case, the Fast PUCCH resources for different terminal devices may be distinguished by using different scrambling codes or different DMRS (Demodulation Reference Signal) sequences (for PUCCH Formats 2, 3 & 4). This reflects that that NACK signalling can be expected to occur relatively rarely and so it can be efficient to share the resource among multiple terminal devices by assigning the same, or overlapping, Fast PUCCH resources to the multiple terminal devices.

It will be appreciated that aspects of the above-described approaches for determining radio resources to use for a Fast NACK (i.e. Fast PUCCH) resources can be combined in some implementations.

When a terminal device has sent a Fast NACK on Fast PUCCH resources it may in some cases also send a NACK again on the Original PUCCH resources. That is to say, in the event the data is not successfully decoded, the terminal device may transmit acknowledgement signalling indicating the data was not successfully decoded both at the time determined for transmitting acknowledgement signalling indicating the data was not successfully decoded and at the time determined for transmitting acknowledgement signalling indicating the data was successfully decoded. This may help increase the reliability of the "NACK" being received by the serving network access node (network infrastructure equipment) and an example is schematically shown in FIG. 10.

Figure 10:
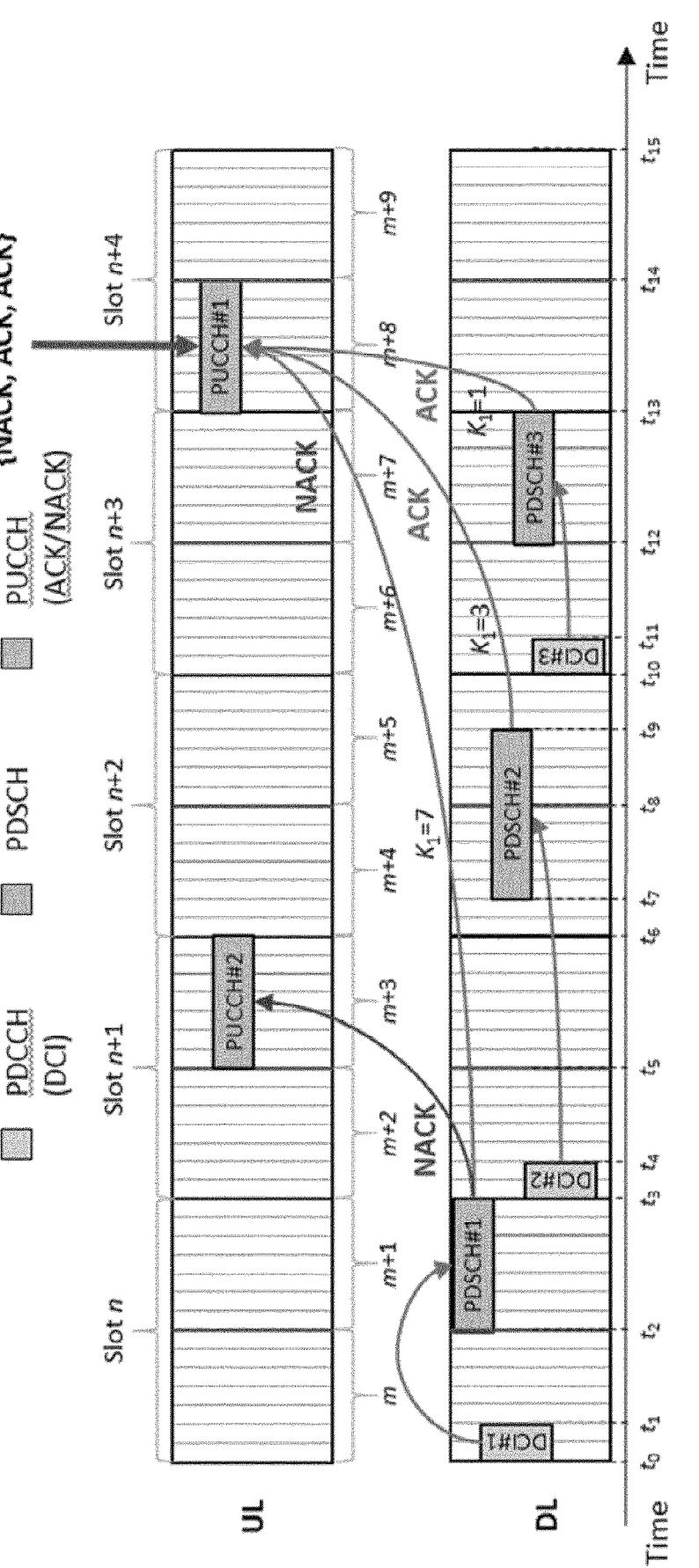

Thus, FIG. 10 is similar to, and will be understood from, FIG. 7, and represents a scenario in which a terminal device sends negative acknowledgement signalling both on Fast PUCCH and Original PUCCH. As schematically represented in FIG. 10, DCI #1, DCI #2 and DCI #3 carry downlink grants which schedule PDSCH #1, PDSCH #2 and PDSCH #3 respectively. As indicated in FIG. 10, for this scenario it is assumed DCI #1 is associated with a PDSCH-to-HARQ_feedback timing indicator value of $K_1$=7, DCI #2 is associated with a PDSCH-to-HARQ_feedback timing indicator value of $K_1$=3, and DCI #3 is associated with a PDSCH-to-HARQ_feedback timing indicator value of $K_1$=1. Thus acknowledgment signalling for PDSCH #1, PDSCH #2 and PDSCH #3 is nominally scheduled to be multiplexed on PUCCH #1.

For the example scenario represented in FIG. 10 it is assumed the terminal device successfully decodes PDSCH #2 and PDSCH #3 but fails to decode PDSCH #1. Consequently the terminal device sends a Fast NACK for PDSCH #1 on PUCCH #2 in accordance with the principles disclosed herein. In addition to sending the Fast NACK for PDSCH #1 on PUCCH #2, the terminal device in this example also sends the NACK on PUCCH #1, as indicated by the solid arrow marked NACK from PDSCH #1 to PUCCH #1 in FIG. 10, such that PUCCH #1 is used for transmitting NACK, ACK and ACK for PDSCH #1 PDSCH #2 and PDSCH #3 respectively in a multiplexed manner.

In other examples, when a terminal device has sent a Fast NACK on Fast PUCCH resources it may not send the NACK again on the Original PUCCH resources. This may help save power for the terminal device and help reduce overall interference in the network, and may be particularly beneficial if Original PUCCH contains only a single HARQ-ACK feedback as not repeating the NACK will help reduce the total number of transmissions by the terminal device.

A terminal device may determine whether or not to resend a NACK on Original PUCCH resources if a Fast NACK has already been sent in respect of a particular PDSCH by taking account of whether the Original PUCCH is to be transmitted anyway for acknowledgement signalling in respect of other PDSCH transmissions in a multiplexed manner. For example, if the number of other PDSCH transmissions is less than a predetermined threshold number, e.g. configured by RRC signalling or defined by standard, the terminal device may determine not to resend a NACK on Original PUCCH resources if a Fast NACK has already been sent on Fast PUCCH.

Whether or not a terminal device should resend a "NACK" in the Original PUCCH after already transmitting a Fast NACK may in some cases be semi-statically configured for the terminal device (e.g. by RRC signalling) or may be determined dynamically, for example from an indication in a DCI carrying the relevant downlink grant.

In some cases, if a Fast NACK is sent for a PDSCH, the Original PUCCH may carry the HARQ-ACK feedback for a retransmission of this PDSCH, assuming the retransmission is scheduled prior to the Original PUCCH. An example of this is shown in 11.

Figure 11:
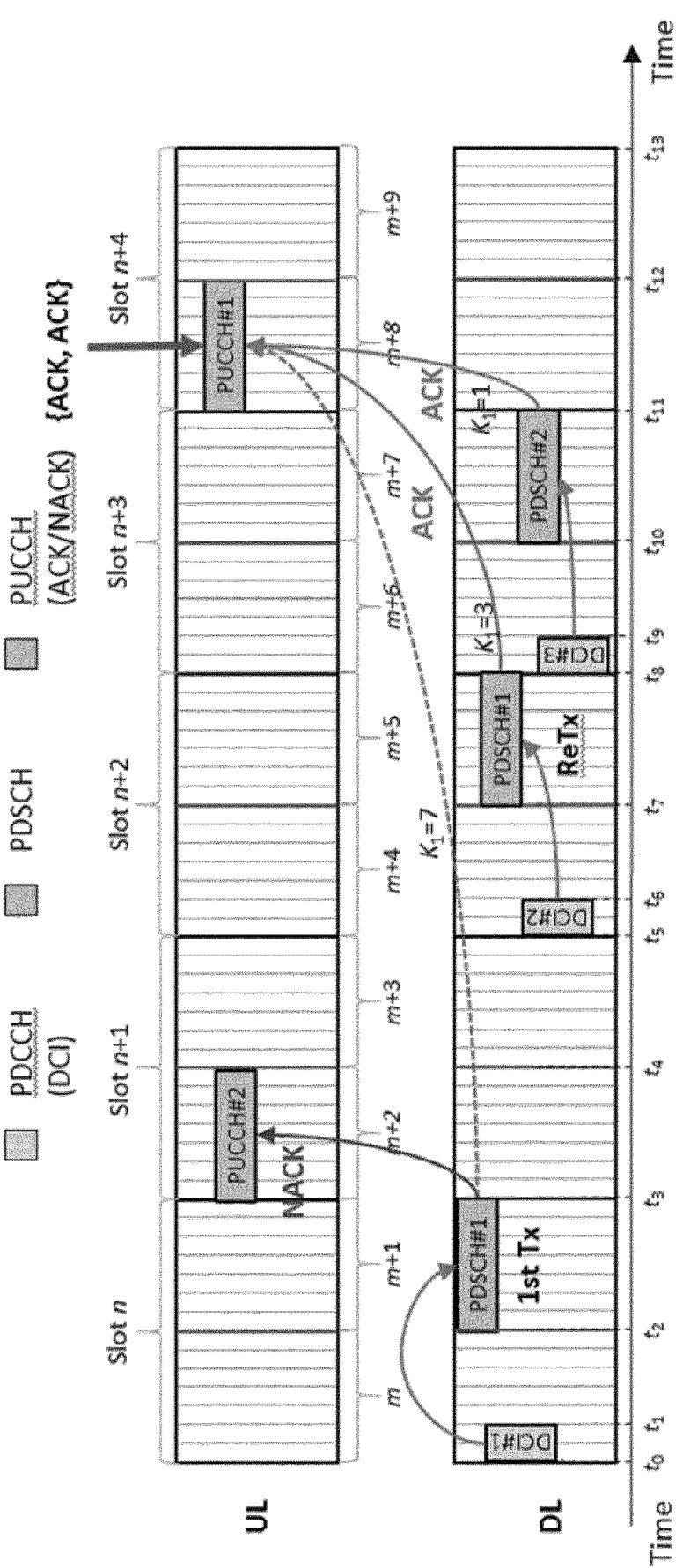

FIG. 11 is similar to, and will be understood from, FIG. 7. As schematically represented in FIG. 11, DCI #1 carries a downlink grant which schedules PDSCH #1 (1st Tx) and for this example it is assumed DCI #1 is associated with a PDSCH-to-HARQ_feedback timing indicator value of $K_1$=7 so that acknowledgment signalling for PDSCH #1 is nominally scheduled to be transmitted on PUCCH #1. In the example scenario represented in FIG. 11 it is assumed the terminal device fails to successfully decode PDSCH #1 and so sends a Fast NACK on PUCCH #2. In response to receiving the NACK for the data transmitted in PDSCH #1 (1stTx), the base station serving the terminal device decides to retransmit the data.

Thus, the terminal device receives downlink control information (DCI #2) indicating an allocation of radio resources to be used to retransmit the data on a physical downlink shared channel (PDSCH #1 (ReTx)) with a PDSCH-to-HARQ_feedback timing indicator value of $K_1=3$. This allows the terminal device to send the acknowledgement signalling for PDSCH #1 (ReTx) on PUCCH #1 in place of the acknowledgement signalling for PDSCH #1 (1stTx). In this example it is assumed having received the retransmission of the data in the PDSCH #1 (ReTx) transmission the terminal device is able to successfully decode the data, e.g. by soft-combining the PDSCH #1 (1stTx) and PDSCH #1 (ReTx) transmissions, and so the terminal device transmits positive acknowledgement signalling (ACK) on PUCCH #1. In this example scenario the terminal device multiplexes the acknowledgement signalling (ACK) in respect of PDSCH #1 (ReTx) with acknowledgement signalling in respect of another transmission of data on PDSCH #2 scheduled by DCI #3, and which in this example is assumed to be successfully decoded. The DCI that allocates PDSCH #1 (ReTX), DCI #2, may be a compact DCI, where a compact DCI can increase the reliability of the DCI signalling (since the effective code rate is lower). In an example compact DCI format, the PDSCH-to-HARQ_feedback timing indicator value for a re-transmission is implicitly determined (and is not explicitly transmitted as a bit field in the DCI). For example, referring to FIG. 11, the terminal device can, by successfully decoding DCI #2 as a compact DCI, infer that the PDSCH-to-HARQ_feedback timing indicator value is $K_1=3$ since the terminal device is aware that the acknowledgement signaling is to be transmitted on the Original PUCCH, PUCCH #1.

Whether or not a terminal device should resend a "NACK" in the Original PUCCH after already transmitting a Fast NACK may in some cases be semi-statically configured for the terminal device (e.g. by RRC signalling) or may be determined dynamically, for example from an indication in a DCI carrying the relevant downlink grant.

FIG. 12 is a flow diagram schematically representing some aspects of a method of operation for a terminal device in a wireless telecommunication system in accordance with certain embodiments of the disclosure.

In a first step, S1, the terminal device attempts to decode a transmission of data to the terminal device.

In a second step, S2, the terminal device determines whether or not the data was successfully decoded.

In a third step, S3, the terminal device transmits acknowledgement signalling indicating whether or not the data was successfully decoded on radio resources that are determined by taking account of whether or not the data was successfully decoded.

FIG. 13 is a flow diagram schematically representing some aspects of a method of operation for a network access node in a wireless telecommunication system in accordance with certain embodiments of the disclosure.

In a first step, T1, the network access node transmits data to a terminal device.

In a second step, T2, the network access node determines first radio resources (e.g. occurring at a first time) to monitor to seek to detect acknowledgement signalling transmitted by the terminal device to indicate the data was successfully decoded by the terminal device.

In a third step, T3, the network access node determines second radio resources (e.g. occurring at a second time) to monitor to seek to detect acknowledgement signalling transmitted by the terminal device to indicate the data was not successfully decoded by the terminal device wherein the second radio resources are different from than the first radio resources (e.g. occurring at a different time).

Thus there has been described a method of operating a terminal device in a wireless telecommunications system, the method comprising: attempting to decode a transmission of data to the terminal device; determining whether or not the data was successfully decoded; determining when to transmit acknowledgment signalling indicating whether or not the data has been successfully decoded in dependence on whether or not the data has been successfully decoded, such that if the data has been successfully decoded it is determined to transmit the acknowledgment signalling at a first time, and if the data has not been successfully decoded it is determined to transmit the acknowledgment signalling at a second time which is earlier than the first time; and transmitting the acknowledgment signalling at the determined time.

Thus there has also been described a method of operating network infrastructure equipment in a wireless telecommunications system, the method comprising: transmitting data to a terminal device; attempting, at a first time, to detect acknowledgement signalling transmitted by the terminal device to indicate the data was successfully decoded by the terminal device; and attempting, at a second time, to detect acknowledgement signalling transmitted by the terminal device to indicate the data was not successfully decoded by the terminal device; wherein the second time is earlier than the first time.

It will be appreciated that while the above-described examples have focused on using different times for sending acknowledgement signalling depending on whether the acknowledgement signalling is positive (ACK) or negative (NACK), it will be appreciated the same principles can be applied more generally to using different radio resources (e.g. occurring at/on different times and/or frequencies) for sending acknowledgement signalling depending on whether the acknowledgement signalling is positive (ACK) or negative (NACK). For example, there may be certain frequencies which are systematically more reliable (e.g. due to lower interference) than others, and negative acknowledgement signalling may be sent on the frequencies which are systematically more reliable while positive acknowledgement signalling may be sent on other frequencies, which may be at the same time (since it may be expected reliable delivery of negative acknowledgement signalling is relatively more important). In another example negative acknowledgement signalling may be sent using more radio resources than positive acknowledgement signalling, which may be at the same time, for example to allow for more redundancy to increase the likelihood of reliable transmission (again because it may be considered in some cases that reliable delivery of negative acknowledgement signalling is relatively more important than reliable delivery of positive acknowledgement signalling).

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/ predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless telecommunications system is not of primary significance to the principles of operation described herein.

It may further be noted various example approaches discussed herein rely on information which is exchanged/ communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

Respective features of the present disclosure are defined by the following numbered paragraphs:

1. A method of operating a terminal device in a wireless telecommunications system, the method comprising: attempting to decode a transmission of data to the terminal device; determining whether or not the data was successfully decoded; and transmitting acknowledgement signalling indicating whether or not the data was successfully decoded on radio resources that are determined by taking account of whether or not the data was successfully decoded.

Paragraph 2. The method paragraph 1, wherein the acknowledgement signalling is transmitted on first radio resources at a first time if it is determined the data was successfully decoded and on second radio resources at a second time if it is determined the data was not successfully decoded, wherein the second time is earlier than the first time.

Paragraph 3. The method paragraph 1 or 2, further comprising attempting to decode a transmission of further data to the terminal device; determining whether or not the further data was successfully decoded; determining further radio resources for transmitting acknowledgement signalling indicating the further data was successfully decoded; and transmitting acknowledgement signalling using the further radio resources regardless of whether or not the data was successfully decoded if the period between the transmission of the further data and a time of the further radio resources is less than a predetermined threshold period.

Paragraph 4. The method of paragraph 3, wherein the predetermined threshold period is determined from radio resource control signalling and/or from an operating standard for the wireless telecommunications system.

Paragraph 5. The method paragraph 1 or 2, further comprising attempting to decode a transmission of further data to the terminal device; determining whether or not the further data was successfully decoded; determining further radio resources for transmitting acknowledgement signalling indicating the further data was successfully decoded; and transmitting acknowledgement signalling using the further radio resources regardless of whether or not the data was successfully decoded if the period between the transmission of downlink control information scheduling the transmission of the further data to the terminal device and a time of the further radio resources is less than a predetermined threshold period.

Paragraph 6. The method of paragraph 5, wherein the predetermined threshold period is determined from radio resource control signalling and/or from an operating standard for the wireless telecommunications system.

Paragraph 7. The method paragraph 1 or 2, further comprising attempting to decode a transmission of further data to the terminal device; determining whether or not the further data was successfully decoded; determining further radio resources for transmitting acknowledgement signalling indicating the further data was successfully decoded; and transmitting acknowledgement signalling using the further radio resources regardless of whether or not the data was successfully decoded in response to receiving an indication the terminal device should do this in association with a transmission of downlink control information scheduling the transmission of the further data.

Paragraph 8. The method paragraph 1 or 2, further comprising attempting to decode a transmission of further data to the terminal device; determining whether or not the further data was successfully decoded; determining further radio resources for transmitting acknowledgement signalling indicating the further data was successfully decoded; and transmitting acknowledgement signalling using the further radio resources regardless of whether or not the data was successfully decoded in response to receiving an indication the terminal device should do this in radio resource control signalling.

Paragraph 9. The method of any of paragraphs 1 to 8, further comprising determining which radio resources to use for transmitting acknowledgement signalling indicating the data was not successfully decoded from a negative acknowledgement signalling resource indication received in association with downlink control information scheduling the transmission of the data to the terminal device.

Paragraph 10. The method of paragraph 9, wherein the negative acknowledgement signalling indication comprises an indication of a time and/or an indication of a frequency to use for transmitting acknowledgement signalling indicating the data was not successfully decoded.

Paragraph 11. The method of paragraph 9 or 10, wherein the radio resources to use for transmitting acknowledgement signalling indicating the data was not successfully decoded and radio resources to use for transmitting acknowledgement signalling indicating the data was successfully decoded are both determined from a value for a common field in the downlink control information.

Paragraph 12. The method of paragraph 11, wherein the radio resources to use for transmitting acknowledgement signalling are determined from the value for the common field in the downlink control information based on a predefined association between each potential value for the common field in the downlink control information and different indicators of which radio resources to use for transmitting acknowledgement signalling according to whether or not the data was successfully decoded.

Paragraph 13. The method of any of paragraphs 11 or 12, wherein the common field in the downlink control information is a PDSCH-to-HARQ_feedback timing indicator field or wherein the common field in the downlink control information is a PUCCH Resource Indicator (PRI) field.

Paragraph 14. The method of and of paragraphs 11 to 13, wherein the value for the common field in the downlink control information indicates how many units of a predefined time period to wait to transmit the acknowledgement signalling, wherein different values for the duration of the predefined time period are used for determining the radio resources to use for transmitting acknowledgement signalling indicating the data was not successfully decoded and for determining the radio resources to use for transmitting acknowledgement signalling indicating the data was successfully decoded.

Paragraph 15. The method of any of paragraphs 1 to 8, wherein a time for the radio resources for transmitting acknowledgement signalling indicating the terminal device did not successfully decode the data is determined by applying a timing offset to the time determined for transmitting acknowledgement signalling indicating the terminal device did successfully decode the data.

Paragraph 16. The method of any of paragraphs 1 to 8, wherein the timing offset is determined from radio resource control signalling and/or from an operating standard for the wireless telecommunications system.

Paragraph 17. The method of any of paragraphs 1 to 16, wherein the terminal device transmits acknowledgement signalling indicating the data was not successfully decoded in preference to transmitting acknowledgement signalling indicating an earlier transmission of data to the terminal device was successfully decoded if there is a conflict in the radio resources determined for transmitting these.

Paragraph 18. The method of paragraph 17, wherein the acknowledgement signalling indicating the data was not successfully decoded is transmitted with a predefined characteristic to indicate it has been sent instead of acknowledgement signalling relating to the earlier transmission of data to the terminal device.

Paragraph 19. The method of any of paragraphs 1 to 18, further comprising attempting to decode a further transmission of further data to the terminal device; determining whether or not the further data was successfully decoded; and, if it is determined that both the data and the further data are not successfully decoded, transmitting acknowledgement signalling indicating both the data and the further data are not successfully decoded at the same time in a multiplexed manner.

Paragraph 20. The method of any of paragraphs 1 to 19, wherein in the event the data is not successfully decoded, the terminal device transmits acknowledgement signalling indicating the data was not successfully decoded both using the radio resources determined for transmitting acknowledgement signalling indicating the data was not successfully decoded and using the radio resources determined for transmitting acknowledgement signalling indicating the data was successfully decoded.

Paragraph 21. The method of any of paragraphs 1 to 20, wherein the terminal device determines first radio resources to use for transmitting the acknowledgement signalling if the data was successfully decoded and determines second radio resources to use for transmitting the acknowledgement signalling if the data was not successfully decoded, and in the event the terminal device transmits acknowledgement signalling indicating the data was not successfully decoded on the second radio resources, the terminal device receives a retransmission of the data and transmits acknowledgement signalling indicating whether or not the retransmission of the data has allowed the data to be successfully decoded using the first radio resources.

Paragraph 22. The method of paragraph 21, wherein the terminal device transmits acknowledgement signalling indicating whether or not the retransmission of the data has allowed the data to be successfully decoded using the first radio resources in response to determining that downlink control information associated with the retransmission of the data comprises a predefined characteristic.

Paragraph 23. The method of paragraph 22, wherein the predefined characteristic for the downlink control information is that the downlink control information comprises a compact format.

Paragraph 21. A terminal device for use in a wireless telecommunication system, wherein the terminal device comprises controller circuitry and transceiver circuitry configured to operate together such that the terminal device is operable to: attempt to decode a transmission of data to the terminal device; determine whether or not the data was successfully decoded; and transmit acknowledgement signalling indicating whether or not the data was successfully decoded on radio resources that are determined by taking account of whether or not the data was successfully decoded.

Paragraph 22. Circuitry for a terminal device for use in a wireless telecommunication system, wherein the circuitry comprises controller circuitry and transceiver circuitry configured to operate together such that the circuitry is operable to cause the terminal device to: attempt to decode a transmission of data to the terminal device; determine whether or not the data was successfully decoded; and transmit acknowledgement signalling indicating whether or not the data was successfully decoded on radio resources that are determined by taking account of whether or not the data was successfully decoded.

Paragraph 23. A method of operating network infrastructure equipment in a wireless telecommunications system, the method comprising: transmitting data to a terminal device; determining first radio resources to monitor to seek to detect acknowledgement signalling transmitted by the terminal device to indicate the data was successfully decoded by the terminal device; and determining second radio resources to monitor to seek to detect acknowledgement signalling transmitted by the terminal device to indicate the data was not successfully decoded by the terminal device, wherein the second radio resources are different from the first radio resources.

Paragraph 24. Network infrastructure equipment for use in a wireless telecommunication system, wherein the network infrastructure equipment comprises controller circuitry and transceiver circuitry configured to operate together such that the network infrastructure equipment is operable to: transmit data to a terminal device; determine first radio resources to monitor to seek to detect acknowledgement signalling transmitted by the terminal device to indicate the data was successfully decoded by the terminal device; and determine second radio resources to monitor to seek to detect acknowledgement signalling transmitted by the terminal device to indicate the data was not successfully decoded by the terminal device; wherein the second radio resources are different from the first radio resources.

Paragraph 25. Circuitry for network infrastructure equipment for use in a wireless telecommunication system, wherein the circuitry comprises controller circuitry and transceiver circuitry configured to operate together such that the circuitry is operable to cause the network infrastructure equipment to: transmit data to a terminal device; determine first radio resources to monitor to seek to detect acknowledgement signalling transmitted by the terminal device to indicate the data was successfully decoded by the terminal device; and determine second radio resources to monitor to seek to detect acknowledgement signalling transmitted by the terminal device to indicate the data was not successfully decoded by the terminal device; wherein the second radio resources are different from the first radio resources.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP document RP-160671, "New SID Proposal: Study on New Radio Access Technology," NTT DOCOMO, RAN #71, Gothenburg, Sweden, 7 to 10 Mar. 2016

[2] 3GPP document RP-172834, "Work Item on New Radio (NR) Access Technology," NTT DOCOMO, RAN #78, Lisbon, Portugal, 18 to 21 Dec. 2017

[3] 3GPP document RP-182089, "New SID on Physical Layer Enhancements for NR Ultra-Reliable and Low Latency Communication (URLLC)," Huawei, HiSilicon, Nokia, Nokia Shanghai Bell, RAN #81, Gold Coast, Australia, 10 to 13 Sep. 2018

[4] 3GPP document RP-190654, "New WID: Physical layer enhancements for NR ultra-reliable and low latency communication (URLLC)," Huawei, HiSilicon, RAN #83, Shenzhen, China, 18 to 21 Mar. 2019

[5] 3GPP document TR 38.913, "Study on Scenarios and Requirements for Next Generation Access Technologies (Release 14)", V14.3.0 (2017-06)

[6] 3GPP document RP-190726, "New WID: Physical layer enhancements for NR ultra-reliable and low latency communication (URLLC)," Huawei, HiSilicon, RAN #83, Shenzhen, China, Mar. 18-21, 2019

[7] 3GPP document RP-193233, "New WID on enhanced Industrial Internet of Things (IoT) and URLLC support," Nokia, Nokia Shanghai Bell, RAN #86, Sitges, Spain, Dec. 9-12, 2019

[8] Holma H. and Toskala A, "LTE for UMTS OFDMA and SC-FDMA based radio access", John Wiley and Sons, 2009

What is claimed is:

1. A method of operating a terminal device in a wireless telecommunications system, the method comprising:
    attempting to decode a transmission of data to the terminal device;
    determining whether or not the data was successfully decoded; and
    transmitting acknowledgement signalling indicating whether or not the data was successfully decoded on radio resources that are determined by taking account of whether or not the data was successfully decoded, wherein the terminal device transmits acknowledgement signalling indicating the data was not successfully decoded in preference to transmitting acknowledgement signalling indicating an earlier transmission of data to the terminal device was successfully decoded in a case that there is a conflict in the radio resources determined for transmitting these.

2. The method of claim 1, wherein the acknowledgement signalling is transmitted on the first radio resources at a first time if it is determined the data was successfully decoded and on the second radio resources at a second time if it is determined the data was not successfully decoded, wherein the second time is earlier than the first time.

3. The method of claim 1, further comprising:
    attempting to decode a transmission of further data to the terminal device;
    determining whether or not the further data was successfully decoded;
    determining further radio resources for transmitting acknowledgement signalling indicating the further data was successfully decoded; and
    transmitting acknowledgement signalling using the further radio resources regardless of whether or not the data was successfully decoded if the period between the transmission of the further data and a time of the further radio resources is less than a predetermined threshold period.

4. The method of claim 3, wherein the predetermined threshold period is determined from radio resource control signalling and/or from an operating standard for the wireless telecommunications system.

5. The method of claim 1, further comprising:
    attempting to decode a transmission of further data to the terminal device;
    determining whether or not the further data was successfully decoded;
    determining further radio resources for transmitting acknowledgement signalling indicating the further data was successfully decoded; and
    transmitting acknowledgement signalling using the further radio resources regardless of whether or not the data was successfully decoded if the period between the transmission of downlink control information scheduling the transmission of the further data to the terminal device and a time of the further radio resources is less than a predetermined threshold period.

6. The method of claim 5, wherein the predetermined threshold period is determined from radio resource control signalling and/or from an operating standard for the wireless telecommunications system.

7. The method of claim 1, further comprising:
    attempting to decode a transmission of further data to the terminal device;
    determining whether or not the further data was successfully decoded;
    determining further radio resources for transmitting acknowledgement signalling indicating the further data was successfully decoded; and
    transmitting acknowledgement signalling using the further radio resources regardless of whether or not the data was successfully decoded in response to receiving an indication the terminal device should do this in association with a transmission of downlink control information scheduling the transmission of the further data.

8. The method of claim 1, further comprising:
    attempting to decode a transmission of further data to the terminal device;
    determining whether or not the further data was successfully decoded;
    determining further radio resources for transmitting acknowledgement signalling indicating the further data was successfully decoded; and
    transmitting acknowledgement signalling using the further radio resources regardless of whether or not the data was successfully decoded in response to receiving an indication the terminal device should do this in radio resource control signalling.

9. The method of claim 1, further comprising determining which radio resources to use for transmitting acknowledgement signalling indicating the data was not successfully decoded from a negative acknowledgement signalling resource indication received in association with downlink control information scheduling the transmission of the data to the terminal device.

10. The method of claim 9, wherein the negative acknowledgement signalling indication comprises an indication of a time and/or an indication of a frequency to use for transmitting acknowledgement signalling indicating the data was not successfully decoded.

11. The method of claim 9, wherein the radio resources to use for transmitting acknowledgement signalling indicating the data was not successfully decoded and radio resources to use for transmitting acknowledgement signalling indicating the data was successfully decoded are both determined from a value for a common field in the downlink control information.

12. The method of claim 11, wherein the radio resources to use for transmitting acknowledgement signalling are determined from the value for the common field in the downlink control information based on a predefined association between each potential value for the common field in the downlink control information and different indicators of which radio resources to use for transmitting acknowledgement signalling according to whether or not the data was successfully decoded.

13. The method of claim 11, wherein the common field in the downlink control information is a PDSCH-to-HARQ_feedback timing indicator field or wherein the common field in the downlink control information is a PUCCH Resource Indicator (PRI) field.

14. The method of claim 11, wherein the value for the common field in the downlink control information indicates how many units of a predefined time period to wait to transmit the acknowledgement signalling, wherein different values for the duration of the predefined time period are used for determining the radio resources to use for transmitting acknowledgement signalling indicating the data was not successfully decoded and for determining the radio resources to use for transmitting acknowledgement signalling indicating the data was successfully decoded.

15. The method of claim 1, wherein a time for the radio resources for transmitting acknowledgement signalling indicating the terminal device did not successfully decode the data is determined by applying a timing offset to the time determined for transmitting acknowledgement signalling indicating the terminal device did successfully decode the data.

16. The method of claim 15, wherein the timing offset is determined from radio resource control signalling and/or from an operating standard for the wireless telecommunications system.

17. The method of claim 1, further comprising:

attempting to decode a further transmission of further data to the terminal device: determining whether or not the further data was successfully decoded; and if it is determined that both the data and the further data are not successfully decoded, transmitting acknowledgement signalling indicating both the data and the further data are not successfully decoded at the same time in a multiplexed manner.

18. A terminal device for use in a wireless telecommunication system, wherein the terminal device comprises controller circuitry and transceiver circuitry configured to operate together such that the terminal device is operable to:

attempt to decode a transmission of data to the terminal device;

determine whether or not the data was successfully decoded; and transmit acknowledgement signalling indicating whether or not the data was successfully decoded on radio resources that are determined by taking account of whether or not the data was successfully decoded; and transmit acknowledgement signalling indicating the data was not successfully decoded in preference to transmitting acknowledgement signalling indicating an earlier transmission of data to the terminal device was successfully decoded if there is a conflict in the radio resources determined for transmitting these.

19. Network infrastructure equipment for use in a wireless telecommunication system, wherein the network infrastructure equipment comprises controller circuitry and transceiver circuitry configured to operate together such that the network infrastructure equipment is operable to:

transmit data to a terminal device;

determine first radio resources to monitor to seek to detect acknowledgement signalling transmitted by the terminal device to indicate the data was successfully decoded by the terminal device; and determine second radio resources to monitor to seek to detect acknowledgement signalling transmitted by the terminal device to indicate the data was not successfully decoded by the terminal device, wherein the second radio resources are different from the first radio resources, and wherein the network infrastructure equipment is configured to monitor the second radio resources in preference to the first radio resources in a case that there is a conflict between the first radio resources and the second radio resources.

* * * * *